US010359610B2

(12) United States Patent
Noda et al.

(10) Patent No.: US 10,359,610 B2
(45) Date of Patent: Jul. 23, 2019

(54) ZOOM LENS AND IMAGING APPARATUS

(71) Applicant: FUJIFILM Corporation, Tokyo (JP)

(72) Inventors: Taiga Noda, Saitama (JP); Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 68 days.

(21) Appl. No.: 15/857,799

(22) Filed: Dec. 29, 2017

(65) Prior Publication Data

US 2018/0267273 A1 Sep. 20, 2018

(30) Foreign Application Priority Data

Mar. 15, 2017 (JP) ................... 2017-049839

(51) Int. Cl.
*G02B 15/14* (2006.01)
*G02B 13/00* (2006.01)
*G02B 15/20* (2006.01)
*G02B 15/163* (2006.01)

(52) U.S. Cl.
CPC ......... *G02B 13/009* (2013.01); *G02B 15/163* (2013.01); *G02B 15/20* (2013.01)

(58) Field of Classification Search
CPC .................................. G02B 13/0045
USPC .......................................... 359/689
See application file for complete search history.

(56) References Cited

U.S. PATENT DOCUMENTS

2014/0132790 A1* 5/2014 Takahashi ............ G02B 15/177
                                                                           348/220.1

FOREIGN PATENT DOCUMENTS

JP         2016-014819 A     1/2016

* cited by examiner

*Primary Examiner* — James C. Jones
(74) *Attorney, Agent, or Firm* — Studebaker & Brackett PC

(57) ABSTRACT

The zoom lens includes: a first lens group that is disposed to be closest to an object side, first moves toward an image side along an optical axis during zooming from a wide-angle end to a telephoto end, and has a positive refractive power; a second lens group that is disposed to be adjacent to the first lens group on the image side of the first lens group, moves during zooming, and has a negative refractive power; a final lens group that is disposed to be closest to the image side, includes an aperture stop, remains stationary during zooming, and has a positive refractive power; and an image side negative lens group that is disposed to be adjacent to the final lens group on the object side of the final lens group, moves during zooming, and has a negative refractive power.

18 Claims, 22 Drawing Sheets

EXAMPLE 1

EXAMPLE 1

FIG. 2
EXAMPLE 1
WIDE-ANGLE END
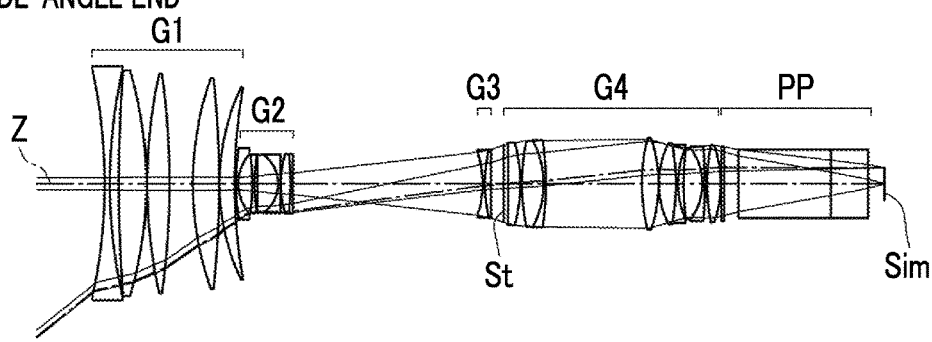
FIRST MIDDLE
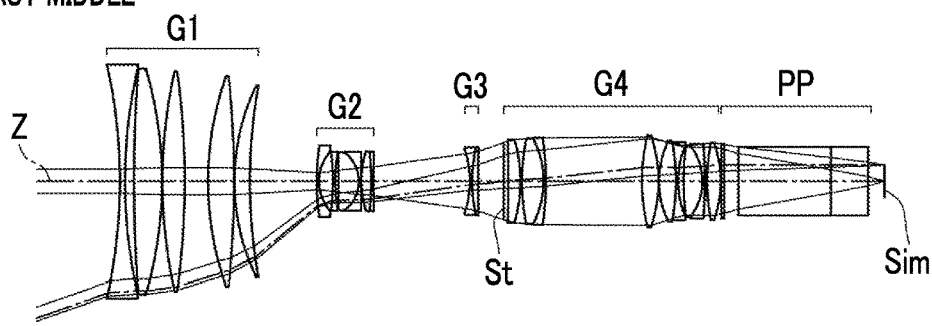
SECOND MIDDLE
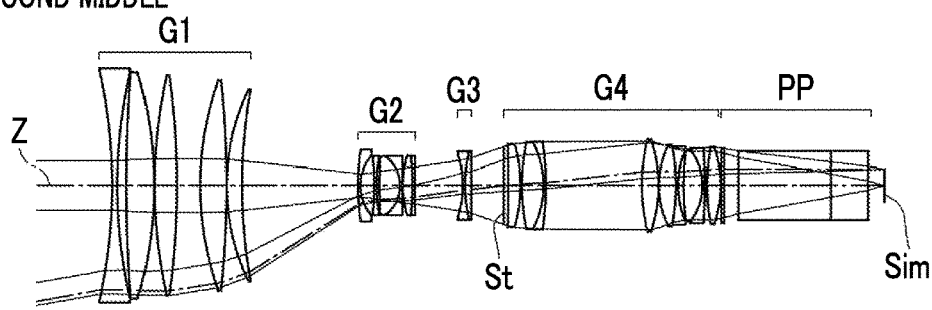
TELEPHOTO END
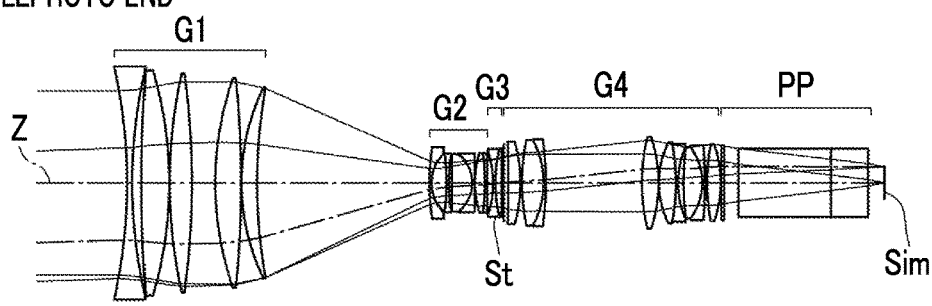

EXAMPLE 2

FIG. 4
EXAMPLE 2
WIDE-ANGLE END
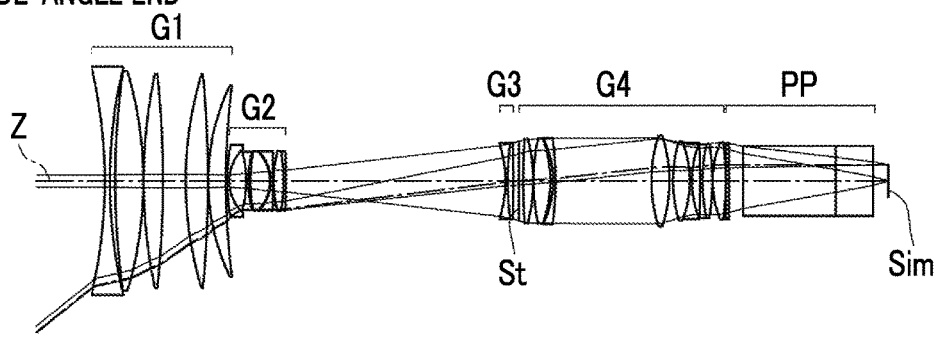
FIRST MIDDLE
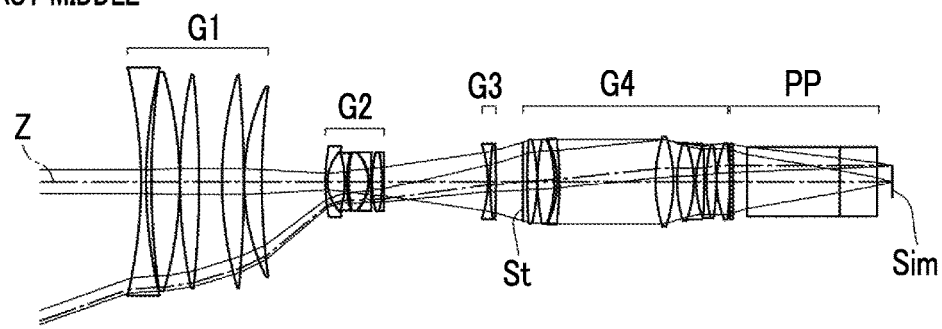
SECOND MIDDLE
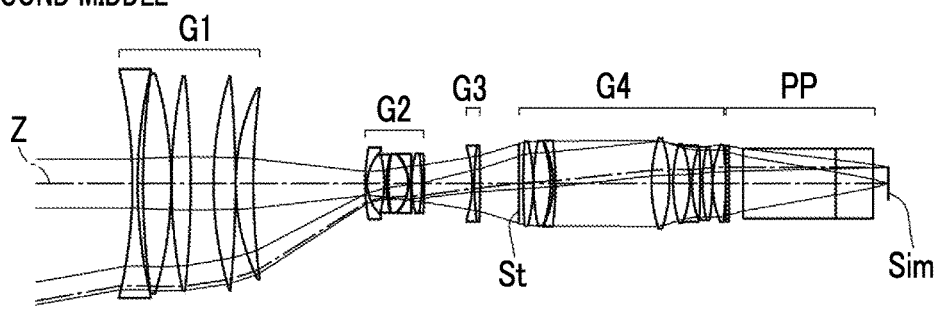
TELEPHOTO END
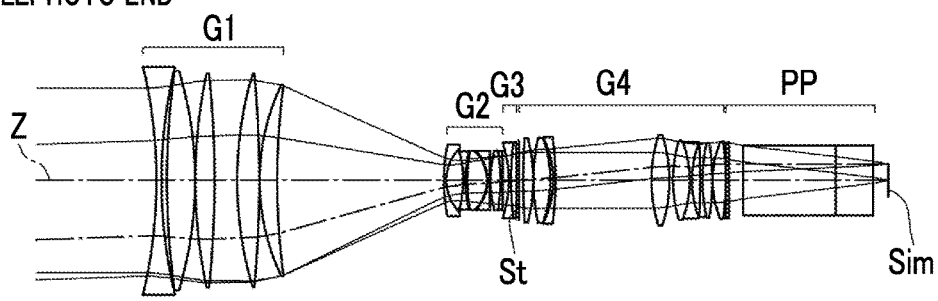

EXAMPLE 3

FIG. 6
EXAMPLE 3
WIDE-ANGLE END
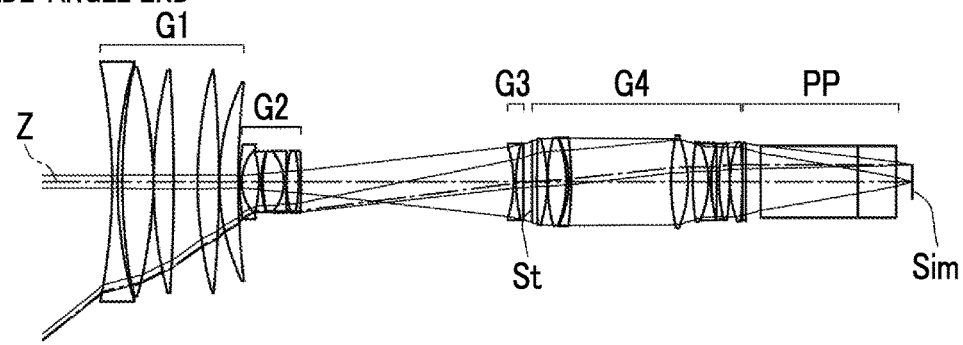
FIRST MIDDLE
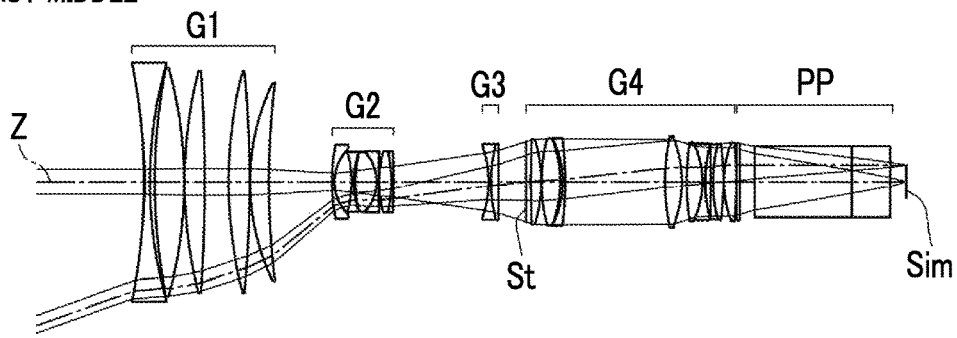
SECOND MIDDLE
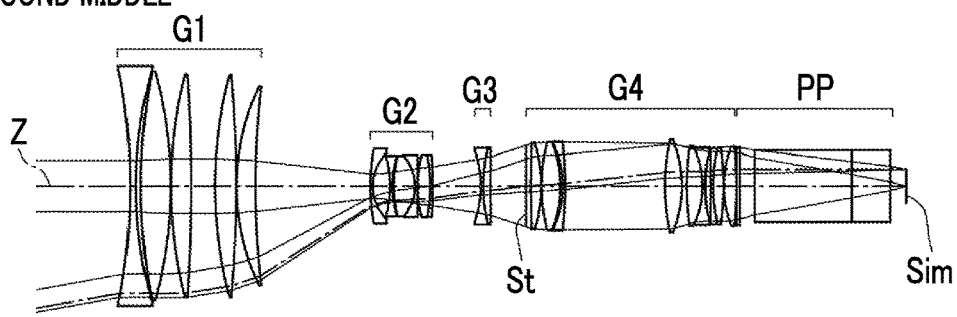
TELEPHOTO END
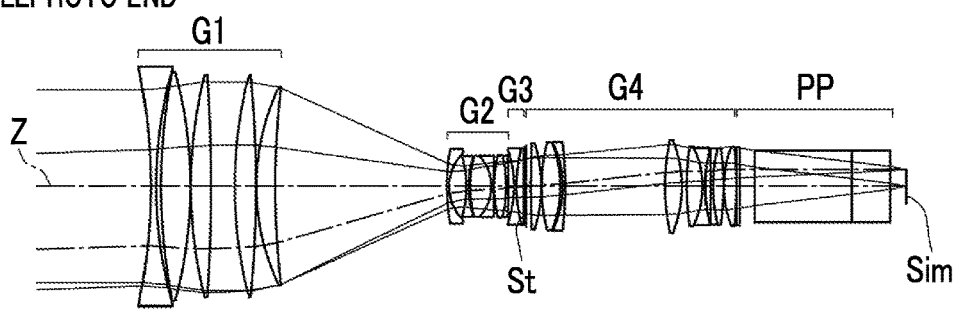

EXAMPLE 4

FIG. 8
EXAMPLE 4
WIDE-ANGLE END
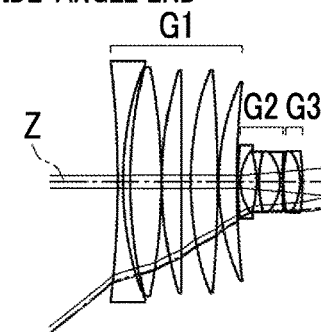
FIRST MIDDLE
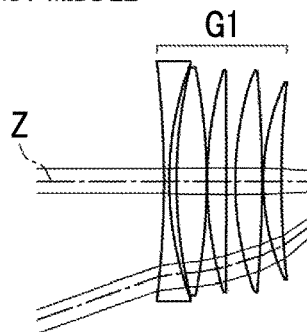
SECOND MIDDLE
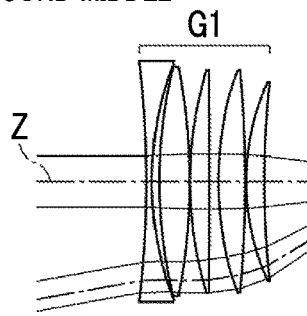
TELEPHOTO END
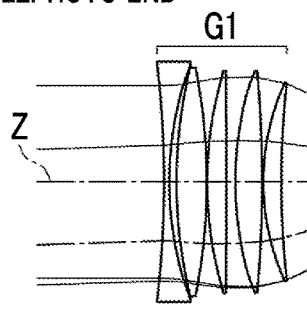

FIG. 10
EXAMPLE 5
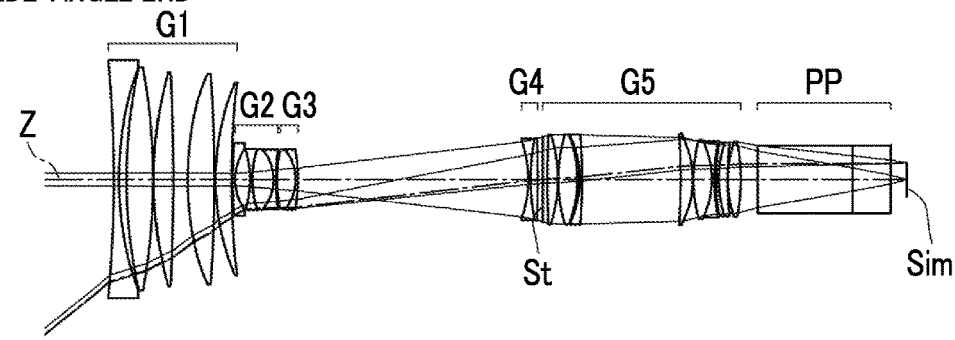
WIDE-ANGLE END
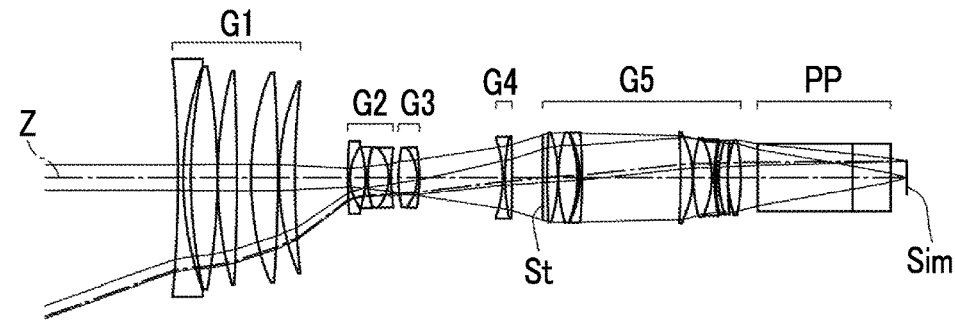
FIRST MIDDLE
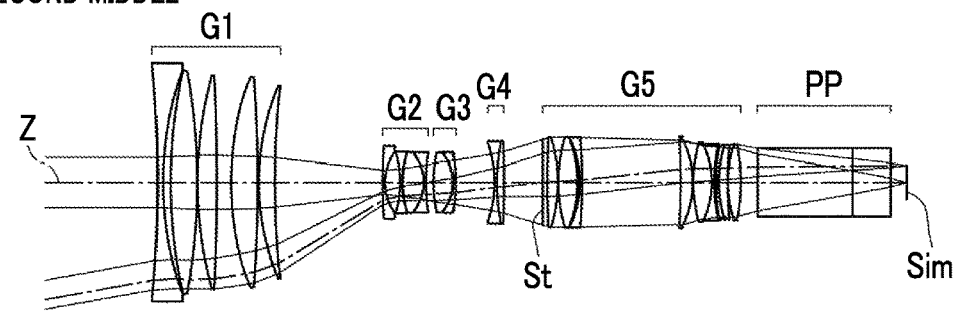
SECOND MIDDLE
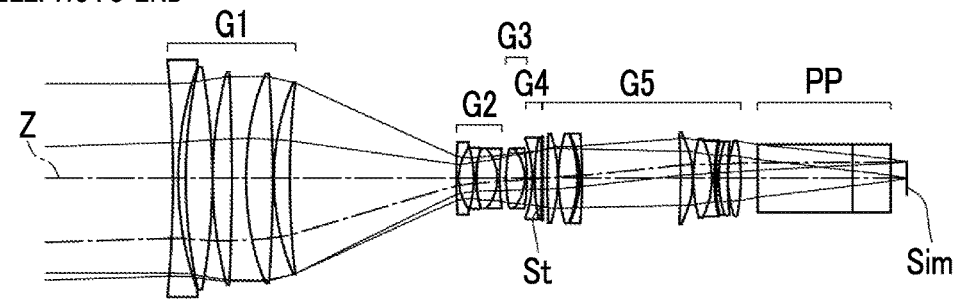
TELEPHOTO END

EXAMPLE 6

FIG. 12
EXAMPLE 6
WIDE-ANGLE END
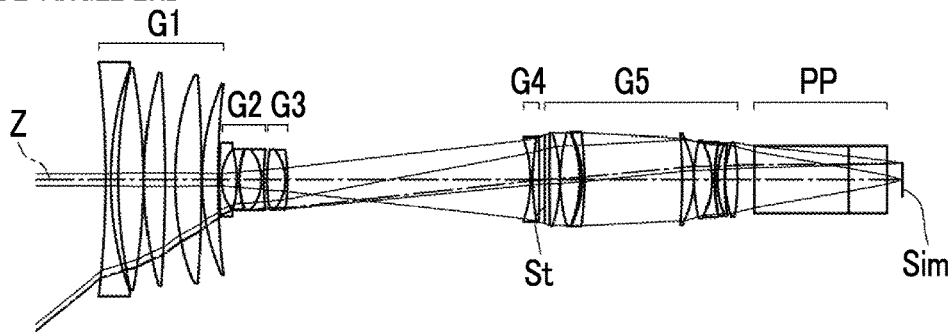
FIRST MIDDLE
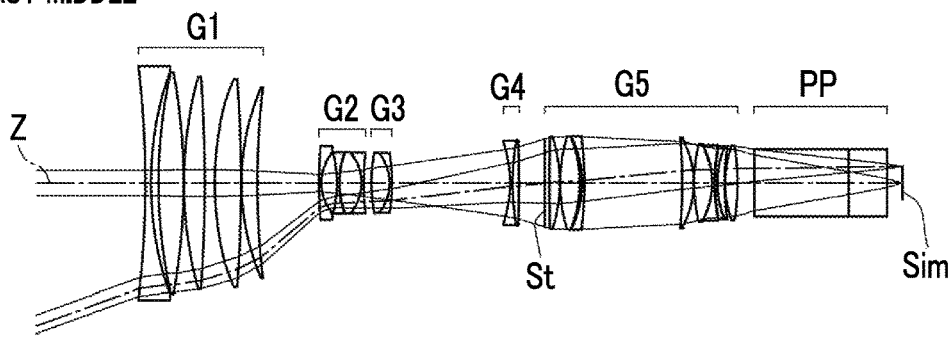
SECOND MIDDLE
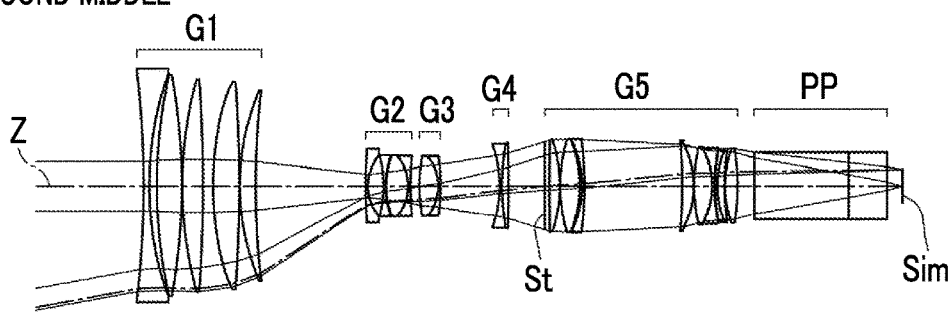
TELEPHOTO END
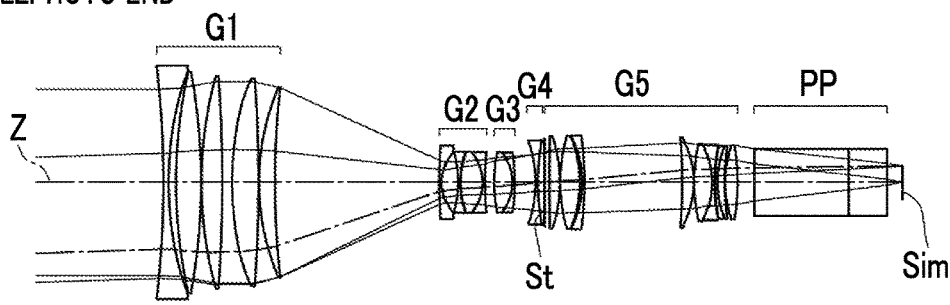

EXAMPLE 7

FIG. 14
EXAMPLE 7
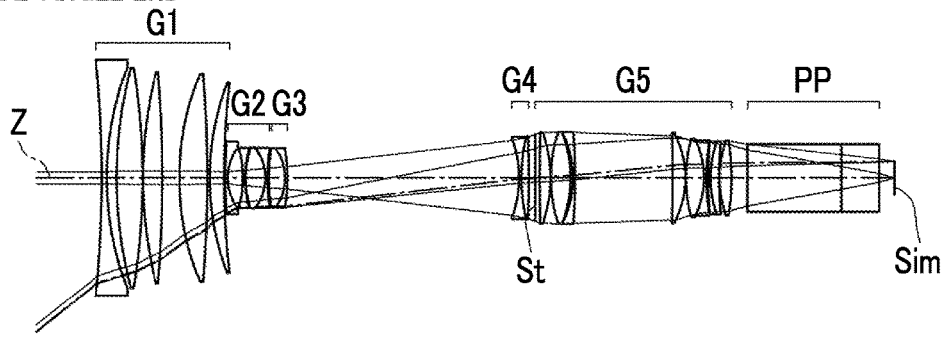
WIDE-ANGLE END
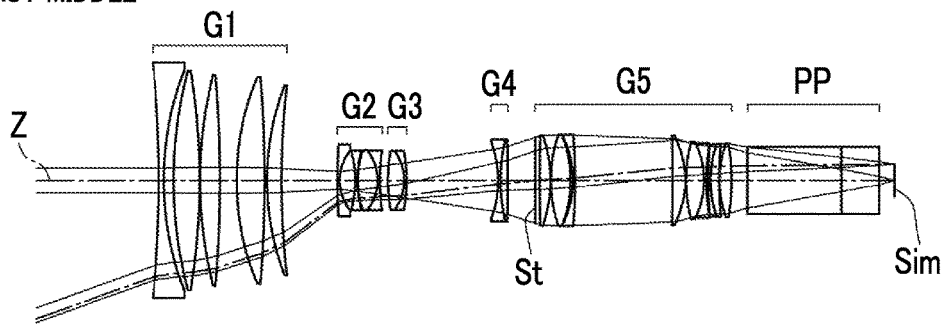
FIRST MIDDLE
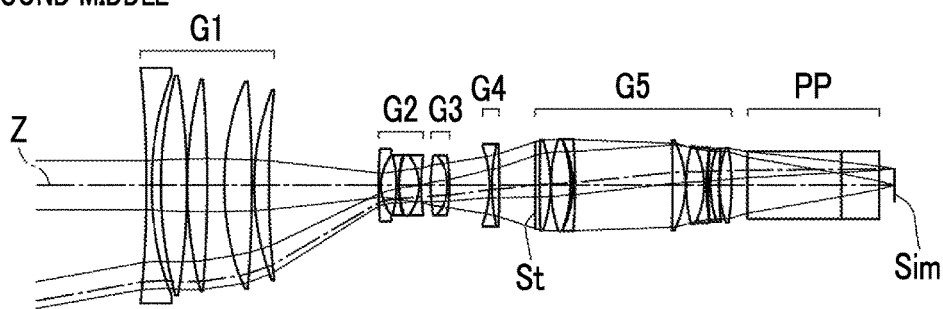
SECOND MIDDLE
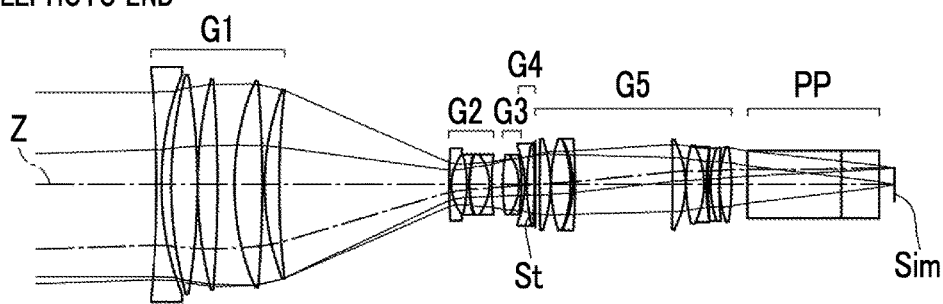
TELEPHOTO END

EXAMPLE 3

EXAMPLE 4

EXAMPLE 7

ZOOM LENS AND IMAGING APPARATUS

CROSS-REFERENCE TO RELATED APPLICATIONS

The present application claims priority under 35 U.S.C. § 119 to Japanese Patent Application No. 2017-049839, filed on Mar. 15, 2017. The above application is hereby expressly incorporated by reference, in its entirety, into the present application.

BACKGROUND OF THE INVENTION

1. Field of the Invention

The present invention relates to a zoom lens suitable for electronic cameras such as broadcast cameras, movie imaging cameras, digital cameras, video cameras, and surveillance cameras, and to an imaging apparatus comprising the zoom lens.

2. Description of the Related Art

In the related art, zoom lenses, each of which is compact and lightweight and has a high zoom ratio, are demanded for broadcast cameras, movie imaging cameras, digital cameras, and the like. In order to meet such demands, for example, the zoom lens described in JP2016-14819A has been proposed. JP2016-14819A discloses a zoom lens having a four-group configuration. The zoom lens consists of, in order from the object side, a first lens group having a positive refractive power, a second lens group having a negative refractive power, a third lens group having a negative refractive power, and a fourth lens group having a positive refractive power.

SUMMARY OF THE INVENTION

There is a demand for the camera to be compact and lightweight so as to have high portability while ensuring a high zoom ratio. In addition to such a demand, there is also a demand for the camera to have high optical performance. As a result, the demanded performance becomes high year by year.

The lens system described in JP2016-14819A has disadvantages such as large fluctuation in spherical aberration during zooming as compared with the recent demand, and it is desirable to further improve the lens system in order to sufficiently satisfy the recent demand for high performance.

The present invention has been made in consideration of the above-mentioned situation, and its object is to provide a zoom lens, which has high optical performance since reduction in size and weight is achieved and various aberrations are satisfactorily corrected while a high zoom ratio is ensured, and an imaging apparatus comprising the zoom lens.

A zoom lens of the present invention comprises: a first lens group that is disposed to be closest to an object side, first moves toward an image side along an optical axis during zooming from a wide-angle end to a telephoto end, and has a positive refractive power; a second lens group that is disposed to be adjacent to the first lens group on the image side of the first lens group, moves along the optical axis during zooming, and has a negative refractive power; a final lens group that is disposed to be closest to the image side, includes an aperture stop, remains stationary with respect to an image plane during zooming, and has a positive refractive power; and an image side negative lens group that is disposed to be adjacent to the final lens group on the object side of the final lens group, moves along the optical axis during zooming, and has a negative refractive power. Distances between the adjacent lens groups in a direction of the optical axis change during zooming. In addition, assuming that a focal length of the image side negative lens group is fN and a focal length of the whole system at the wide-angle end in a case where an object at infinity is in focus is fw, Conditional Expression (1) is satisfied.

$$-15 < fN/fw < -3.5 \tag{1}$$

It is preferable that the zoom lens of the present invention satisfies Conditional Expression (1-1).

$$-12 < fN/fw < -4.5 \tag{1-1}$$

In the zoom lens of the present invention, assuming that a difference in position of the first lens group between the wide-angle end and the telephoto end in the direction of the optical axis is zr1 and a difference in position of the second lens group between the wide-angle end and the telephoto end in the direction of the optical axis is zr2, it is preferable that Conditional Expression (2) is satisfied, and it is more preferable that Conditional Expression (2-1) is satisfied.

$$0.05 < |zr1/zr2| < 0.4 \tag{2}$$

$$0.08 < |zr1/zr2| < 0.35 \tag{2-1}$$

In the zoom lens of the present invention, assuming that a focal length of the final lens group is fE and a focal length of the whole system at the wide-angle end in a case where the object at infinity is in focus is fw, it is preferable that Conditional Expression (3) is satisfied, and it is more preferable that Conditional Expression (3-1) is satisfied.

$$4 < fE/fw < 10 \tag{3}$$

$$4.5 < fE/fw < 8 \tag{3-1}$$

In the zoom lens of the present invention, assuming that a lateral magnification of the image side negative lens group at the wide-angle end in a case where the object at infinity is in focus is $\beta Nw$ and a lateral magnification of the image side negative lens group at the telephoto end in a case where the object at infinity is in focus is $\beta Nt$, it is preferable that Conditional Expression (4) is satisfied, and it is more preferable that Conditional Expression (4-1) is satisfied.

$$0.7 < |\beta Nt/\beta Nw| < 1.5 \tag{4}$$

$$0.75 < |\beta Nt/\beta Nw| < 1.2 \tag{4-1}$$

In the zoom lens of the present invention, it is preferable that the first lens group has three or more positive lenses, and has a negative lens which is disposed to be closest to the object side.

In the zoom lens of the present invention, assuming that an average of Abbe numbers of all positive lenses of the first lens group at a d line is vavep, it is preferable that Conditional Expression (5) is satisfied, and it is more preferable that Conditional Expression (5-1) is satisfied.

$$65 < vavep < 90 \tag{5}$$

$$70 < vavep < 80 \tag{5-1}$$

In the zoom lens of the present invention, it is preferable that during zooming from the wide-angle end to the telephoto end, the first lens group first moves toward the image side along the optical axis, thereafter reversely moves toward the object side, and thereafter reversely moves toward the image side.

The zoom lens of the present invention may be configured to consist of, in order from the object side, the first lens group, the second lens group, the image side negative lens group, and the final lens group. Alternatively, the zoom lens of the present invention may be configured to consist of, in order from the object side, the first lens group, the second lens group, an intermediate positive lens group that moves by changing a distance between the intermediate positive lens group and the adjacent lens group in the direction of the optical axis during zooming and has a positive refractive power, the image side negative lens group, and the final lens group.

The zoom lens of the present invention may be configured to perform focusing from the object at infinity to a close-range object by moving only some lenses of the first lens group along the optical axis. Alternatively, the zoom lens of the present invention may be configured such that the first lens group consists of a plurality of sub-lens groups, and may be configured to perform focusing from the object at infinity to a close-range object by moving at least two of the sub-lens groups in a state where a relative distance therebetween in the direction of the optical axis is set to be different. Alternatively, the zoom lens may be configured to perform focusing from the object at infinity to a close-range object by moving the second lens group and a lens group, which is disposed to be adjacent to the second lens group on the image side of the second lens group, in a state where a relative distance therebetween in the direction of the optical axis is set to be different.

An imaging apparatus of the present invention comprises the zoom lens of the present invention.

In the present description, it should be noted that the terms "consisting of ~" and "consists of ~" mean that the imaging lens may include not only the above-mentioned elements but also lenses substantially having no powers, optical elements, which are not lenses, such as a stop, a filter, and a cover glass, and mechanism parts such as a lens flange, a lens barrel, an imaging element, and a hand shaking correction mechanism.

It should be noted that the "~ group having a positive refractive power" means that the group has a positive refractive power as a whole. Likewise, the "~ group having a negative refractive power" means that the group has a negative refractive power as a whole. The "lens group" is not necessarily composed of a plurality of lenses, but may be composed of only one lens. Signs of refractive powers of the lens groups and signs of refractive powers of the lenses are assumed as those in paraxial regions in a case where some lenses have aspheric surfaces. All the conditional expressions are based on the d line (a wavelength of 587.56 nm (nanometers)) in a state where an object at infinity is in focus.

According to the present invention, the zoom lens comprises: the first lens group that is disposed to be closest to the object side and has a positive refractive power; the second lens group that has a negative refractive power; the image side negative lens group; and the final lens group that is disposed to be closest to the image side and has a positive refractive power. In the zoom lens, the behavior of each lens group during zooming, the position of the aperture stop, the refractive power of the image side negative lens group, and the like are suitably set. Thereby, it is possible to provide a zoom lens, which is capable of achieving reduction in size and weight while ensuring a high zoom ratio and achieving high optical performance by satisfactorily correcting various aberrations, and an imaging apparatus comprising the zoom lens.

BRIEF DESCRIPTION OF THE DRAWINGS

FIG. 2 is a cross-sectional view illustrating a configuration and optical paths of the zoom lens of Example 1 of the present invention at the wide-angle end, the first middle focal length state, the second middle focal length state, and the telephoto end.

FIG. 4 is a cross-sectional view illustrating a configuration and optical paths of the zoom lens of Example 2 of the present invention at the wide-angle end, the first middle focal length state, the second middle focal length state, and the telephoto end.

FIG. 6 is a cross-sectional view illustrating a configuration and optical paths of the zoom lens of Example 3 of the present invention at the wide-angle end, the first middle focal length state, the second middle focal length state, and the telephoto end.

FIG. 8 is a cross-sectional view illustrating a configuration and optical paths of the zoom lens of Example 4 of the present invention at the wide-angle end, the first middle focal length state, the second middle focal length state, and the telephoto end.

FIG. 10 is a cross-sectional view illustrating a configuration and optical paths of the zoom lens of Example 5 of the present invention at the wide-angle end, the first middle focal length state, the second middle focal length state, and the telephoto end.

FIG. 12 is a cross-sectional view illustrating a configuration and optical paths of the zoom lens of Example 6 of the present invention at the wide-angle end, the first middle focal length state, the second middle focal length state, and the telephoto end.

FIG. 14 is a cross-sectional view illustrating a configuration and optical paths of the zoom lens of Example 7 of the present invention at the wide-angle end, the first middle focal length state, the second middle focal length state, and the telephoto end.

DESCRIPTION OF THE PREFERRED EMBODIMENTS

Figure 1:
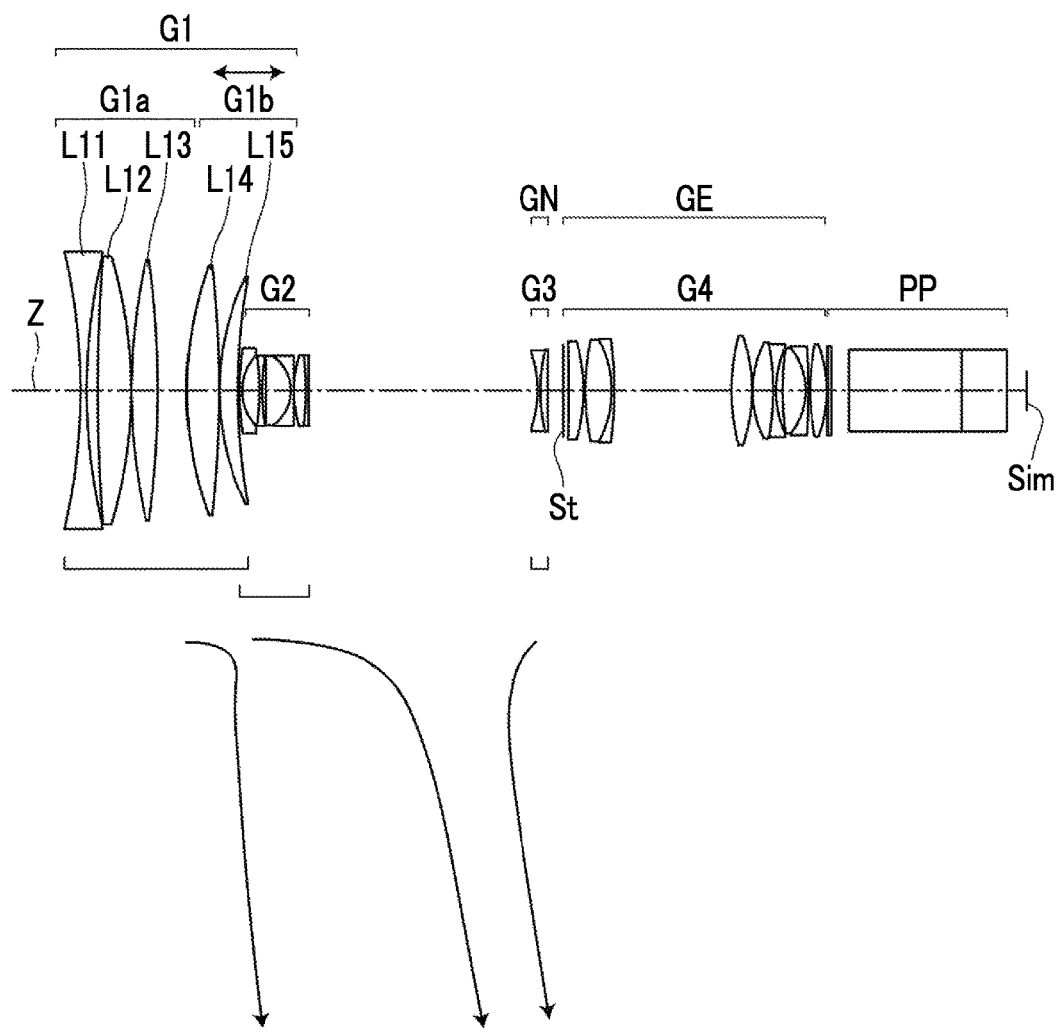
FIG. 1 is a cross-sectional view illustrating a lens configuration and a movement locus of a zoom lens of Example 1 of the present invention at the wide-angle end.

Hereinafter, embodiments of the present invention will be described with reference to drawings. FIG. 1 is a cross-sectional view illustrating a lens configuration of a zoom lens of an embodiment of the present invention at the wide-angle end. FIG. 2 is a cross-sectional view illustrating a lens configuration and optical paths of the zoom lens in the respective states. The examples shown in FIGS. 1 and 2 correspond to the zoom lens of Example 1 to be described later. FIGS. 1 and 2 each show a state where the object at infinity is in focus, where the left side of the drawing is the object side and the right side of the drawing is the image side.

In FIG. 1, under each lens group moving during zooming, a movement locus of each lens group during zooming from the wide-angle end to the telephoto end is schematically indicated by an arrow.

In FIG. 2, the wide-angle end state is shown in the top part labeled "wide-angle end", the first middle focal length state is shown in the second part which is second from the top and is labeled the "first middle", the second middle focal length state is shown in the third part which is third from the top and is labeled the "second middle", and the telephoto end state is shown in the bottom part labeled the "telephoto end". The focal length of the whole system increases in order of the wide-angle end state, the first middle focal length state, the second middle focal length state, and the telephoto end state. The definition of the first middle focal length state and the second middle focal length state will be described later in detail. The rays in FIG. 2 indicate on-axis rays and rays with the maximum angle of view in the respective states.

In order to apply the zoom lens to an imaging apparatus, it is preferable to provide various filters, a prism, and/or a protective cover glass based on specification of the imaging apparatus. Thus, FIG. 1 shows an example where an optical member PP, in which those are considered and the incident surface and the exit surface are parallel, is disposed between the lens system and the image plane Sim. Although the optical member PP in FIG. 1 consists of three members, the number of members composing the optical member PP is not limited to that in FIG. 1, and in the present invention, the optical member PP may be omitted.

The zoom lens is configured to comprise: a first lens group G1 that is disposed to be closest to an object side; a second lens group G2 that is disposed to be adjacent to the first lens group G1 on the image side of the first lens group G1; a final lens group GE that includes an aperture stop St, is disposed to be closest to the image side, and has a positive refractive power; and an image side negative lens group GN that is disposed to be adjacent to the final lens group GE on the object side of the final lens group GE, where distances between the adjacent lens groups in a direction of the optical axis change during zooming.

The zoom lens of FIG. 1 consists of, in order from the object side, the first lens group G1, the second lens group G2, a third lens group G3, and a fourth lens group G4. The third lens group G3 corresponds to the image side negative lens group GN, and the fourth lens group G4 corresponds to the final lens group GE. It should be noted that the aperture stop St shown in FIG. 1 does not necessarily indicate its sizes and/or shapes, and indicates a position of the aperture stop St on the optical axis Z.

The first lens group G1 is configured to have a positive refractive power as a whole and first move toward the image side along the optical axis Z during zooming from the wide-angle end to the telephoto end. By forming the lens group closest to the object side as a lens group having a positive refractive power, it is possible to reduce the total length of the lens system. As a result, there is an advantage in achieving reduction in size. In the lens system similar to that of the present embodiment, the height of off-axis rays passing through the first lens group G1 tends to increase in the middle zoom range. Therefore, by adopting a configuration in which the first lens group G1 first moves toward the image side during zooming from the wide-angle end as a starting point, it is possible to reduce the height of off-axis rays passing through the first lens group G1, and it is possible to reduce the effective diameter of the first lens group G1. As a result, it is possible to achieve reduction in weight.

Further, it is preferable that, during zooming from the wide-angle end to the telephoto end, the first lens group G1 is configured to first move toward the image side along the optical axis Z and thereafter reversely move toward the object side. The state where the first lens group G1 reversely moves from the image side to the object side is referred to as a first middle focal length state. By reversely moving the first lens group G1 toward the object side, there is an advantage in achieving an increase in focal length of the whole system while achieving reduction in size of the lens system.

In addition, it is preferable that the first lens group G1 is configured to reversely move from the object side to the image side during zooming from the first middle focal length state to the telephoto end. The state where the first lens group G1 reversely moves from the object side to the image side during zooming from the first middle focal length state to the telephoto end is referred to as a second middle focal length state. By reversely moving the first lens group G1 from the object side to the image side in the second middle focal length state, it is possible to minimize an amount of movement of the image side negative lens group GN moving toward the image side. Therefore, there is an advantage in ensuring a distance between the image side negative lens group GN and the final lens group GE at the telephoto end.

That is, it is preferable that during zooming from the wide-angle end to the telephoto end, the first lens group G1 first moves toward the image side along the optical axis Z, thereafter reversely moves toward the object side, and thereafter reversely moves toward the image side. The first lens group G1 in the example shown in FIG. 1 moves toward the image side in a range from the wide-angle end to the first middle focal length state, moves toward the object side in a range from the first middle focal length state to the second middle focal length state, and moves toward the image side in a range from the second middle focal length state to the telephoto end.

Further, it is preferable that the first lens group G1 has three or more positive lenses, and has a negative lens which is disposed to be closest to the object side. By forming the lens closest to the object side as a negative lens, it is possible to minimize the incident angle of off-axis rays incident from the negative lens to the lens on the image side. As a result, there is an advantage in achieving an increase in angle of view. Further, by setting the number of positive lenses provided in the first lens group G1 to three or more, there is an advantage in correcting spherical aberration. The first lens group G1 in FIG. 1 consists of, in order from the object side, a lens L11 which is a negative lens and lenses L12 to L15 which are four positive lenses. In a case where the first lens group G1 is configured to consist of five lenses in such a manner, there is an advantage in achieving both a small-size and lightweight structure and favorable performance.

The second lens group G2 has a negative refractive power as a whole, and moves along the optical axis Z during zooming. With the negative refractive power, the second lens group G2 is able to perform a major function of zooming.

The final lens group GE is configured to have a positive refractive power as a whole, remain stationary with respect to the image plane Sim during zooming, and include the aperture stop St. With the positive refractive power, the final lens group GE is able to perform a major imaging function. In addition, since the final lens group GE remains stationary during zooming, it is possible to suppress fluctuation in F number caused by zooming. Furthermore, since the lens group that is disposed to be closest to the image side and is immovable during zooming has the aperture stop St, it is possible to minimize an incident angle of principal rays with a peripheral angle of view onto the image plane Sim while minimizing the effective diameter of the first lens group G1.

The image side negative lens group GN has a negative refractive power as a whole, and moves along the optical axis Z during zooming. By giving the negative refractive power to the image side negative lens group GN, even in a case where the number of lenses of the final lens group GE is reduced, it is possible to reduce the total length of the lens system while ensuring a sufficient back focal length. In addition, the image side negative lens group GN moves during zooming, and is thereby able to perform a function of correcting fluctuation in image plane position caused by zooming.

Assuming that a focal length of the image side negative lens group GN is fN and a focal length of the whole system at the wide-angle end in a case where an object at infinity is in focus is fw, the zoom lens is configured to satisfy Conditional Expression (1). By not allowing the result of Conditional Expression (1) to be equal to or less than the lower limit, the refractive power of the image side negative lens group GN can be ensured, and the amount of movement of the image side negative lens group GN during zooming can be suppressed. As a result, it is possible to reduce the total length of the lens system. By not allowing the result of Conditional Expression (1) to be equal to or greater than the upper limit, the refractive power of the image side negative lens group GN is prevented from becoming excessively strong. As a result, it is possible to suppress fluctuations in various aberrations such as spherical aberration and longitudinal chromatic aberration caused by zooming. In order to enhance the effect relating to Conditional Expression (1), it is more preferable that Conditional Expression (1-1) is satisfied.

$$-15<fN/fw<-3.5 \quad (1)$$

$$-12<fN/fw<-4.5 \quad (1\text{-}1)$$

Assuming that a difference in position of the first lens group G1 between the wide-angle end and the telephoto end in the direction of the optical axis Z is z1 and a difference in position of the second lens group G2 between the wide-angle end and the telephoto end in the direction of the optical axis Z is z2, it is preferable that the zoom lens satisfies Conditional Expression (2). By not allowing the result of Conditional Expression (2) to be equal to or less than the lower limit, the amount of movement of the second lens group G2 during zooming is prevented from becoming excessively large relative to the amount of movement of the first lens group G1, off-axis rays passing through the first lens group G1 in the middle zoom range can be suppressed to be low. As a result, it is possible to minimize the effective diameter of the first lens group G1. By not allowing the result of Conditional Expression (2) to be equal to or greater than the upper limit, the amount of movement of the first lens group G1 during zooming can be prevented from being relatively close to the amount of movement of the second lens group G2. As a result, It is possible to reduce the change in position of the center of gravity of the lens system during zooming while ensuring the zoom ratio. In order to enhance the effect relating to Conditional Expression (2), it is more preferable that Conditional Expression (2-1) is satisfied.

$$0.05<|z1/z2|<0.4 \quad (2)$$

$$0.08<|z1/z2|<0.35 \quad (2\text{-}1)$$

Further, assuming that a focal length of the final lens group GE is fE and a focal length of the whole system at the wide-angle end in a case where an object at infinity is in focus is fw, it is preferable that the zoom lens satisfies Conditional Expression (3). By not allowing the result of Conditional Expression (3) to be equal to or less than the lower limit, the refractive power of the final lens group GE is prevented from becoming excessively strong. Therefore, it becomes easy to make the incident angle of principal rays with a peripheral angle of view onto the image plane Sim close to 0 degree while ensuring a sufficient back focal length. By not allowing the result of Conditional Expression (3) to be equal to or greater than the upper limit, the refractive power of the final lens group GE is ensured. As a result, it is possible to prevent an increase in total length of the lens system. In order to enhance the effect relating to Conditional Expression (3), it is more preferable that Conditional Expression (3-1) is satisfied.

$$4<fE/fw<10 \quad (3)$$

$$4.5<fE/fw<8 \quad (3\text{-}1)$$

Further, assuming that a lateral magnification of the image side negative lens group GN at the wide-angle end in a case where the object at infinity is in focus is βNw and a lateral magnification of the image side negative lens group GN at the telephoto end in a case where the object at infinity is in focus is βNt, it is preferable that the zoom lens satisfies Conditional Expression (4). By satisfying Conditional Expression (4), it is possible to suitably maintain balance between the load of zooming to the image side negative lens group GN and the load of zooming to the lens group contributing to zooming on the object side of the image side negative lens group GN. By not allowing the result of Conditional Expression (4) to be equal to or less than the lower limit, it is possible to ensure the zooming efficiency of the image side negative lens group GN, and it is possible to prevent an increase in amount of movement of the lens group contributing to zooming on the object side of the image side negative lens group GN. As a result, it is possible to suppress fluctuations in aberrations during zooming. By not allowing the result of Conditional Expression (4) to be equal to or greater than the upper limit, the proportion contributing to zooming of the image side negative lens group GN is prevented from becoming excessively large, and thus there are advantages in suppressing an increase in number of lenses of the image side negative lens group GN and in achieving reduction in size and weight. As a result, it is possible to reduce aberration fluctuation during zooming. In order to enhance the effect relating to Conditional Expression (4), it is more preferable that Conditional Expression (4-1) is satisfied.

$$0.7 < |\beta Nt/\beta Nw| < 1.5 \quad (4)$$

$$0.75 < |\beta Nt/\beta Nw| < 1.2 \quad (4\text{-}1)$$

Further, assuming that an average of Abbe numbers of all positive lenses of the first lens group G1 at a d line is vavep, it is preferable that the zoom lens satisfies Conditional Expression (5). By not allowing the result of Conditional Expression (5) to be equal to or less than the lower limit, it becomes easy to correct longitudinal chromatic aberration. By not allowing the result of Conditional Expression (5) to be equal to or greater than the upper limit, it is possible to prevent the positive lens of the first lens group G1 from being composed of only a material having a high Abbe number. Since the optical material having a high Abbe number inevitably has a low refractive index, if the result of Conditional Expression (5) is equal to or greater than the upper limit, in order to ensure a desired refractive power, the absolute value of the radius of curvature of the lens surface decreases. As a result, an increase in weight is caused by an increase in lens thickness. In order to enhance the effect relating to Conditional Expression (5), it is more preferable that Conditional Expression (5-1) is satisfied.

$$65 < \text{vave} p < 90 \quad (5)$$

$$70 < \text{vave} p < 80 \quad (5\text{-}1)$$

In addition, the zoom lens of FIG. 1 is configured to consist of, in order from the object side, the first lens group G1, the second lens group G2, the image side negative lens group GN, and the final lens group GE. In such a case, it is possible to achieve a high zoom ratio while simplifying the configuration with a small number of lens groups.

However, the zoom lens of the present invention may be composed of the number of lens groups different from that of the example of FIG. 1. For example, the zoom lens of the present invention may be configured to consist of, in order from the object side, the first lens group G1, the second lens group G2, an intermediate positive lens group which moves along the optical axis Z during zooming and has a positive refractive power, the image side negative lens group GN, and the final lens group GE. In such a case, the intermediate positive lens group is able to perform a function of correcting fluctuations in field curvature, spherical aberration, and lateral chromatic aberration caused by zooming by changing a distance between itself and the second lens group G2. Thereby, there is an advantage in satisfactorily correcting various aberrations over the entire zoom range. Further, by providing the positive refractive power, which is a refractive power having a different sign from that of the second lens group G2, to the intermediate positive lens group, it is possible to further enhance the above-mentioned effect. At that time, in a case where the intermediate positive lens group is configured to be located on the image side of the wide-angle end at the telephoto end, the configuration can be made such that the total length is short even in a case where the zoom ratio is set to be high.

In the zoom lens of the present invention, various methods can be adopted for focusing from the object at infinity to the close-range object. For example, focusing may be performed by moving only some lenses of the first lens group G1 along the optical axis Z. In such a manner, by adopting a configuration in which only some lenses of the first lens group G1 move during focusing and the remaining lenses do not move with respect to the image plane Sim, it is possible to achieve reduction in weight of the lens group moving during focusing.

Alternatively, the first lens group G1 is configured to consist of a plurality of sub-lens groups, and at least two sub-lens groups among them are moved in a state where a relative distance therebetween in the direction of the optical axis is set to be different, whereby focusing may be performed. In such a manner, by adopting a floating method of moving the plurality of sub-lens groups with mutually different loci during focusing, it becomes easy to suppress aberration fluctuation caused by focusing.

Alternatively, the second lens group G2 and the lens group, which is disposed to be adjacent to the second lens group G2 on the image side of the second lens group G2, is moved in a state where a relative distance therebetween in the direction of the optical axis is set to be different, whereby focusing may be performed. By focusing on the two lens groups having small lens diameters in such a manner, it is possible to achieve reduction in weight of an apparatus also including a mechanism section.

In the example of FIG. 1, the first lens group G1 consists of, in order from the object side, a first-a sub-lens group G1a and a first-b sub-lens group G1b. The first-a sub-lens group G1a consists of lenses L11 to L13 in order from the object side, and the first-b sub-lens group G1b consists of lenses L14 and L15 in order from the object side. During focusing, the configuration is made such that only the two lenses L14 and L15 composing the first-b sub-lens group G1b are integrally moved in the direction of the optical axis. In FIG. 1, a double arrow in the horizontal direction is noted above the reference sign of the lens group moving during focusing.

It should be noted that the above-mentioned preferred configurations and available configurations may be arbitrary combinations, and it is preferable to selectively adopt the configurations in accordance with required specification. According to the present embodiment, it is possible to realize a zoom lens which has a high optical performance by achieving reduction in size and weight and satisfactorily correcting various aberrations while ensuring a high zoom ratio. It should be noted that the "high zoom ratio" described herein means a zoom ratio of 15 times or more.

Next, numerical examples of the zoom lens of the present invention will be described.

Example 1

A configuration of a zoom lens of Example 1 is shown in FIGS. 1 and 2, and an illustration method thereof is as described above. Therefore, repeated description is partially omitted herein. The zoom lens of Example 1 consists of, in order from the object side, a first lens group G1 having a positive refractive power, a second lens group G2 having a negative refractive power, a third lens group G3 having a negative refractive power, and a fourth lens group G4 having a positive refractive power. The third lens group G3 corresponds to the image side negative lens group GN, and the fourth lens group G4 corresponds to the final lens group GE. During zooming, the first lens group G1, the second lens group G2, and the third lens group G3 move by changing the distances between adjacent lens groups, and the fourth lens group G4 remains stationary with respect to the image plane Sim. The first lens group G1 consists of, in order from the object side, a first-a sub-lens group G1a and a first-b sub-lens group G1b. The first-a sub-lens group G1a consists of lenses L11 to L13 in order from the object side, and the first-b sub-lens group G1b consists of lenses L14 and L15 in order from the object side. During focusing from the object at infinity to the close-range object, only the first-b sub-lens group G1b moves in the direction of the optical axis. The above is a schematic configuration of the zoom lens of Example 1.

Table 1 shows basic lens data of the zoom lens of Example 1, Table 2 shows variable surface distances, Table 3 shows aspheric coefficients thereof, and Table 4 shows diffractive surface coefficients. In Table 1, the column of Si shows a surface number i (i=1, 2, 3, . . . ) attached to an i-th surface of the elements, where i sequentially increases toward the image side in a case where an object side surface of an element closest to the object side is regarded as a first surface. The column of Ri shows a radius of curvature of the i-th surface. The column of Di shows a distance on the optical axis Z between the i-th surface and an (i+1)th surface. In Table 1, the column of Ndj shows a refractive index of a j-th (j=1, 2, 3, . . . ) element at the d line (a wavelength of 587.6 nm (nanometers)), where j sequentially increases toward the image side when the surface of the element closest to the object side is regarded as the first surface. The column of vdj shows an Abbe number of the j-th element on the basis of the d line. The column of θgFj shows a partial dispersion ratio of the j-th element between the g line (a wavelength of 435.8 nm (nanometers)) and the F line (a wavelength of 486.1 nm (nanometers)). It should be noted that the partial dispersion ratio θgF between the g line and the F line of a certain lens is defined by θgF=(Ng−NF)/(NF−NC), where the refractive indexes of the lens at the g line, the F line, and the C line (a wavelength of 656.3 nm (nanometers)) are Ng, NF, and NC, respectively.

Here, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, a term of (St) is also noted. A value at the bottom place of Di indicates a distance between the image plane Sim and the surface closest to the image side in the table. In Table 1, the variable surface distances during zooming are referenced by the reference signs DD[ ], and are written into places of Di, where object side surface numbers of distances are noted in [ ].

In the range of Table 2, values of the zoom ratio Zr, the focal length f of the whole system, the F number FNo., the maximum total angle of view 2ω, and the variable surface distance are based on the d line. (o) in the place of 2ω indicates that the unit thereof is a degree. In Table 2, values in the wide-angle end state, the first middle focal length state, the second middle focal length state, and the telephoto end state are respectively shown in the columns labeled wide-angle end, first middle, second middle, and telephoto end. The values of Tables 1 and 2 are values in a state where the object at the infinity is in focus.

In Table 1, the reference sign * is attached to surface numbers of aspheric surfaces, and numerical values of the paraxial radius of curvature are written into the column of the radius of curvature of the aspheric surface. Table 3 shows surface numbers of the aspheric surfaces of Example 1, and aspheric coefficients of the respective aspheric surfaces. The "E±n" (n: an integer) in numerical values of the aspheric coefficients of Table 3 indicates "×10$^{±n}$". The aspheric coefficients are values of the coefficients KA and Am (m=3, 4, 5, . . . 10) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric coefficients, and Σ in the aspheric surface expression means the sum with respect to m.

In Table 1, the term (DOE) is noted after the surface number of the diffractive optical surface. Table 4 shows surface numbers of the diffractive optical surfaces of Example 1 and diffractive surface coefficients of the respective diffractive optical surfaces. The "E−n" (n: an integer) in numerical values of the diffractive surface coefficients of Table 4 indicates "×10$^{-n}$". The diffractive optical surface applied to each lens is represented by a macroscopic lens shape as a basic shape and an optical path difference function Φ(h) where the addition amount of the optical path length which should be set for the diffractive optical surface is represented by a function of the height h from the optical axis Z. The diffractive surface coefficient is a value of each coefficient Pk (k=2, 4, 6, 8) in the optical path difference function Φ(h)

$$\Phi(h) = \lambda/(2\pi) \times \Sigma Pk \times h^k$$

Here, λ is a wavelength,

Pk is a diffractive surface coefficient, h is a height (a distance from the optical axis to the lens surface), and Σ in the optical path difference function Φ(h) means the sum with respect to k.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Si | Ri | Di | Ndj | vdj | θgFj |
|---|---|---|---|---|---|
| 1 | −178.52902 | 1.800 | 1.80610 | 33.27 | 0.58845 |
| *2 | 171.01070 | 3.183 | | | |
| 3(DOE) | 494.28189 | 9.708 | 1.48749 | 70.24 | 0.53007 |
| 4 | −134.94353 | 0.120 | | | |
| 5 | 169.73134 | 7.881 | 1.43387 | 95.18 | 0.53733 |
| 6 | −272.20689 | 8.255 | | | |
| *7 | 106.94600 | 9.293 | 1.43387 | 95.18 | 0.53733 |
| 8 | −339.83772 | 0.120 | | | |
| 9 | 74.64775 | 5.483 | 1.77121 | 50.88 | 0.54797 |
| 10 | 183.04791 | DD[10] | | | |
| 11 | 80.68246 | 0.800 | 2.00069 | 25.46 | 0.61364 |
| 12 | 15.35074 | 4.951 | | | |
| 13 | −77.07530 | 0.800 | 1.88300 | 40.76 | 0.56679 |
| 14 | 56.02093 | 1.087 | | | |

TABLE 1-continued

Example 1

| Si | Ri | Di | Ndj | vdj | θgFj |
|---|---|---|---|---|---|
| 15 | 1761.44494 | 7.226 | 1.80809 | 22.76 | 0.63073 |
| 16 | −12.44467 | 0.800 | 1.81600 | 46.62 | 0.55682 |
| 17 | 668.66098 | 0.120 | | | |
| 18 | 33.71000 | 3.510 | 1.63854 | 55.38 | 0.54858 |
| 19 | −85.47588 | 0.800 | 1.88300 | 40.76 | 0.56679 |
| 20 | 641.15656 | DD[20] | | | |
| 21 | −33.38389 | 0.810 | 1.69680 | 55.53 | 0.54341 |
| 22 | 51.19951 | 2.138 | 1.80809 | 22.76 | 0.63073 |
| 23 | 1692.99598 | DD[23] | | | |
| 24(St) | ∞ | 1.600 | | | |
| 25 | −673.28904 | 4.339 | 1.77250 | 49.60 | 0.55212 |
| 26 | −50.60024 | 0.534 | | | |
| 27 | 70.73627 | 7.636 | 1.60311 | 60.64 | 0.54148 |
| 28 | −31.37175 | 0.800 | 1.88300 | 40.76 | 0.56679 |
| 29 | −109.28977 | 34.000 | | | |
| 30 | 61.28189 | 5.976 | 1.48749 | 70.24 | 0.53007 |
| 31 | −48.93639 | 0.120 | | | |
| 32 | 30.68428 | 6.003 | 1.48749 | 70.24 | 0.53007 |
| 33 | −72.95053 | 0.800 | 1.88300 | 40.76 | 0.56679 |
| 34 | 30.88050 | 1.910 | | | |
| 35 | 84.98778 | 6.689 | 1.51633 | 64.14 | 0.53531 |
| 36 | −19.97875 | 0.800 | 1.83481 | 42.71 | 0.56431 |
| 37 | −186.32425 | 0.650 | | | |
| 38 | 68.89885 | 4.828 | 1.58313 | 59.37 | 0.54345 |
| 39 | −38.56646 | 0.200 | | | |
| 40 | ∞ | 1.000 | 1.51633 | 64.14 | 0.53531 |
| 41 | ∞ | 5.000 | | | |
| 42 | ∞ | 33.000 | 1.60859 | 46.44 | 0.56664 |
| 43 | ∞ | 13.200 | 1.51633 | 64.05 | 0.53463 |
| 44 | ∞ | 5.730 | | | |

TABLE 2

Example 1

| | Wide-Angle End | First Middle | Second Middle | Telephoto End |
|---|---|---|---|---|
| Zr | 1.0 | 2.0 | 4.0 | 22.1 |
| f | 7.910 | 15.738 | 31.312 | 174.819 |
| FNo. | 1.85 | 1.85 | 1.85 | 2.76 |
| 2ω(°) | 76.0 | 37.6 | 19.6 | 3.6 |
| DD[10] | 0.500 | 23.650 | 41.008 | 60.746 |
| DD[20] | 66.616 | 33.579 | 16.477 | 2.172 |
| DD[23] | 4.482 | 8.984 | 11.476 | 0.755 |

TABLE 3

Example 1

| Surface Number | 2 | 7 |
|---|---|---|
| KA | 1.0000000E+00 | 1.0000000E+00 |
| A3 | 0.0000000E+00 | 0.0000000E+00 |
| A4 | −8.3173153E−09 | −1.4317499E−08 |
| A5 | −8.9726355E−11 | 7.4754853E−12 |
| A6 | 2.2159992E−11 | 1.7482118E−11 |
| A7 | 8.1668506E−14 | −2.7659116E−14 |
| A8 | −1.7720076E−14 | −3.2487532E−15 |
| A9 | −2.8151443E−17 | 2.4634751E−17 |
| A10 | 4.6591561E−18 | −1.1533823E−18 |

TABLE 4

Example 1

| Surface Number | 3 |
|---|---|
| P2 | −2.219143E−01 |
| P4 | 2.009635E−05 |
| P6 | −5.039614E−09 |
| P8 | 7.013394E−12 |

Figure 15:
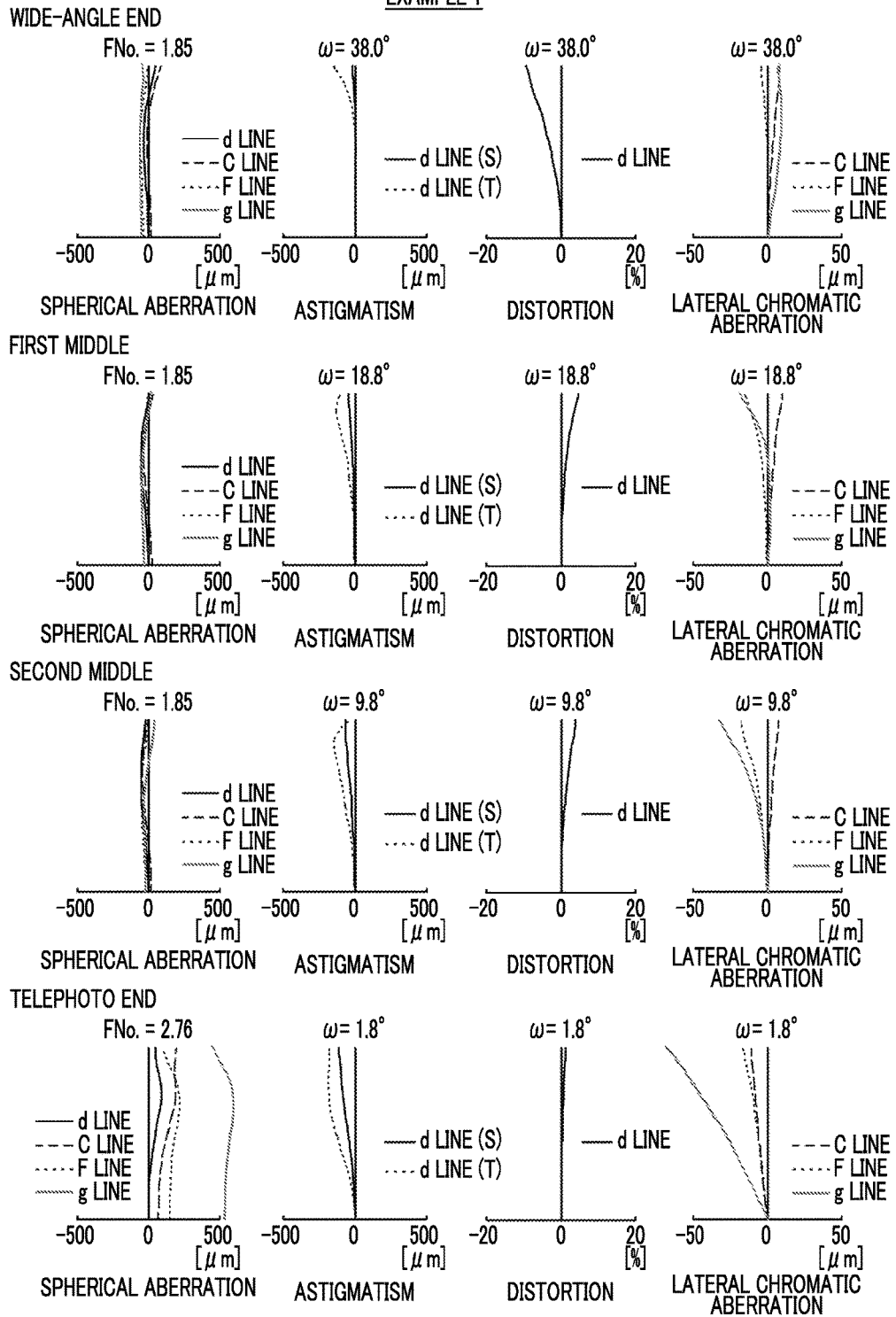
FIG. 15 is a diagram of aberrations of the zoom lens of Example 1 of the present invention.

FIG. 15 shows aberration diagrams in a state where an object at the infinity is brought into focus through the zoom lens of Example 1. In FIG. 15, in order from the left side, spherical aberration, astigmatism, distortion, and lateral chromatic aberration are shown. In FIG. 15, the wide-angle end state is shown in the top part labeled wide-angle end, the first middle focal length state is shown in the second part which is second from the top and is labeled the first middle, the second middle focal length state is shown in the third part which is third from the top and is labeled the second middle, and the telephoto end state is shown in the bottom part labeled the telephoto end. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the gray solid line. In the spherical aberration diagram, FNo. indicates an F number. In the other aberration diagrams, w indicates a half angle of view.

Reference signs, meanings, and description methods of the respective data pieces according to Example 1 are the same as those in the following examples unless otherwise noted. Therefore, in the following description, repeated description will be omitted.

Example 2

Figure 3:
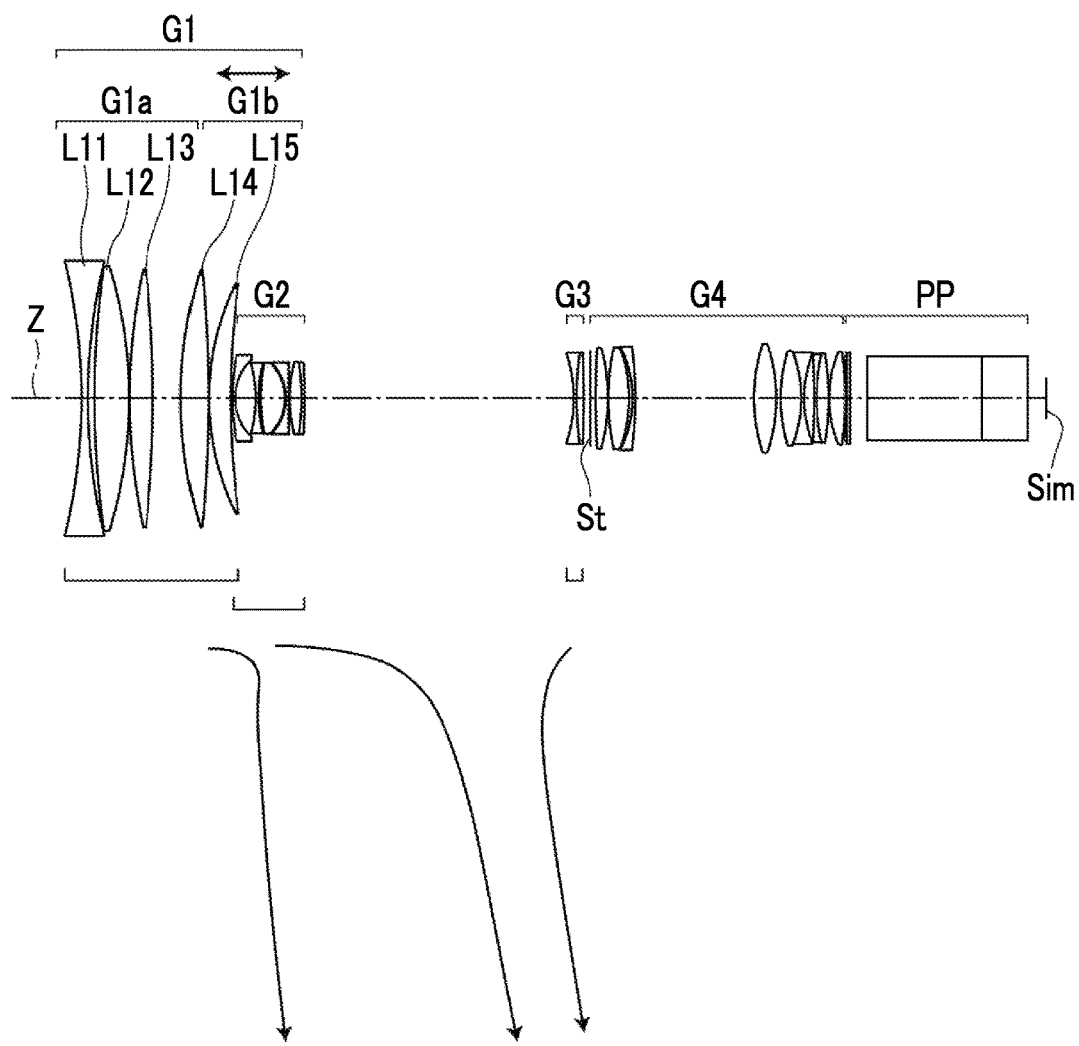
FIG. 3 is a cross-sectional view illustrating a lens configuration and a movement locus of a zoom lens of Example 2 of the present invention at the wide-angle end.
Figure 16:
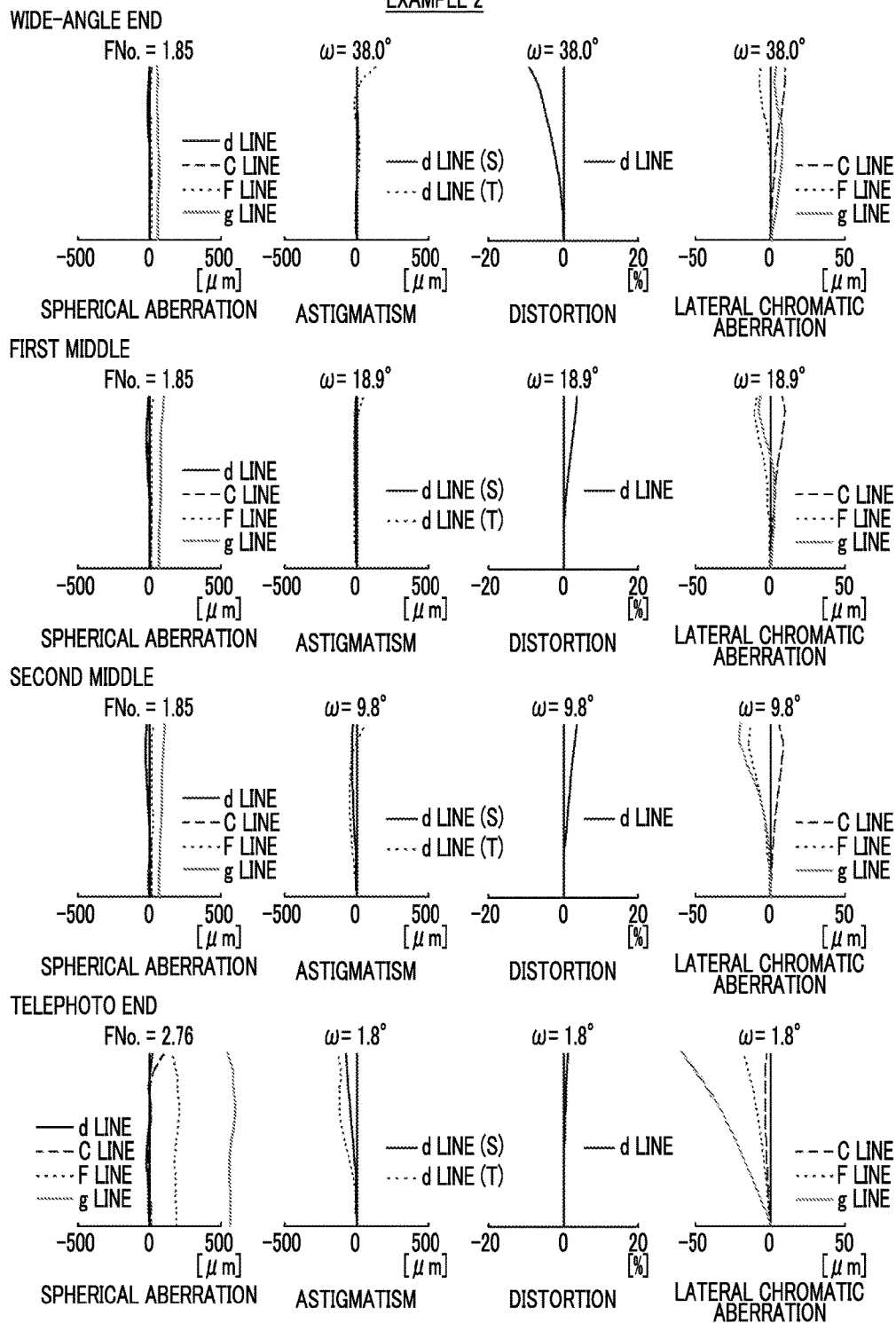
FIG. 16 is a diagram of aberrations of the zoom lens of Example 2 of the present invention.

FIG. 3 is a cross-sectional view illustrating a lens configuration of the zoom lens of Example 2 at the wide-angle end. FIG. 4 is a cross-sectional view illustrating a lens configuration and an optical path thereof at the respective states. The schematic configuration of the zoom lens of Example 2 is the same as that of Example 1. Table 5 shows basic lens data of the zoom lens of Example 2, Table 6 shows specification and variable surface distances, Table 7 shows aspheric coefficients, Table 8 shows diffractive surface coefficients, and FIG. 16 shows aberration diagrams in a state where the object at the infinity is in focus.

TABLE 5

Example 2

| Si | Ri | Di | Ndj | vdj | θgFj |
|---|---|---|---|---|---|
| 1 | −166.28070 | 1.800 | 1.80610 | 33.27 | 0.58845 |
| *2 | 168.89515 | 1.903 | | | |
| 3(DOE) | 270.55463 | 9.921 | 1.48749 | 70.24 | 0.53007 |

TABLE 5-continued

Example 2

| Si | Ri | Di | Ndj | vdj | θgFj |
|---|---|---|---|---|---|
| 4 | −130.75865 | 0.120 | | | |
| 5 | 174.56104 | 6.791 | 1.43387 | 95.18 | 0.53733 |
| 6 | −348.97121 | 8.062 | | | |
| *7 | 127.28203 | 7.818 | 1.43387 | 95.18 | 0.53733 |
| 8 | −387.90038 | 0.120 | | | |
| 9 | 75.12392 | 6.218 | 1.78342 | 49.66 | 0.54975 |
| *10 | 245.32421 | DD[10] | | | |
| 11 | 62.05516 | 0.800 | 2.00069 | 25.46 | 0.61364 |
| *12 | 14.98086 | 6.000 | | | |
| 13 | −36.79035 | 0.800 | 1.88300 | 40.76 | 0.56679 |
| 14 | 39.97843 | 0.681 | | | |
| 15 | 53.19881 | 6.900 | 1.80809 | 22.76 | 0.63073 |
| 16 | −14.41834 | 0.250 | 1.54490 | 25.24 | 0.75933 |
| 17 | −14.48828 | 0.800 | 1.81600 | 46.62 | 0.55682 |
| 18 | 1127.24249 | 0.244 | | | |
| 19 | 40.54757 | 3.510 | 1.63854 | 55.38 | 0.54858 |
| 20 | −60.39447 | 0.800 | 1.88300 | 40.76 | 0.56679 |
| 21 | −366.53467 | DD[21] | | | |
| 22 | −40.58078 | 0.810 | 1.69680 | 55.53 | 0.54341 |
| 23 | 96.23971 | 2.000 | 1.80809 | 22.76 | 0.63073 |
| 24 | −407.56344 | DD[24] | | | |
| 25(St) | ∞ | 1.600 | | | |
| 26 | 252.80530 | 3.500 | 1.77250 | 49.60 | 0.55212 |
| 27 | −56.68594 | 0.120 | | | |
| 28 | 69.73204 | 5.935 | 1.49700 | 81.54 | 0.53748 |
| 29 | −41.54210 | 0.987 | 1.54490 | 25.24 | 0.75933 |
| 30 | −32.85607 | 0.800 | 1.88300 | 40.76 | 0.56679 |
| 31 | −116.62838 | 34.000 | | | |
| 32 | 50.48569 | 6.373 | 1.48749 | 70.24 | 0.53007 |
| *33 | −47.56739 | 1.254 | | | |
| 34 | 46.37850 | 5.901 | 1.48749 | 70.24 | 0.53007 |
| 35 | −37.21195 | 0.800 | 1.88300 | 40.76 | 0.56679 |
| 36 | 34.79590 | 2.870 | | | |
| 37 | −241.61313 | 0.800 | 1.85025 | 30.05 | 0.59797 |
| 38 | 55.42259 | 3.510 | 1.66672 | 48.32 | 0.56101 |
| 39 | −80.62372 | 0.120 | | | |
| 40 | 34.33872 | 4.619 | 1.56384 | 60.67 | 0.54030 |
| 41 | −102.63306 | 0.120 | | | |
| 42 | ∞ | 1.000 | 1.51633 | 64.14 | 0.53531 |
| 43 | ∞ | 5.000 | | | |
| 44 | ∞ | 33.000 | 1.60859 | 46.44 | 0.56664 |
| 45 | ∞ | 13.200 | 1.51633 | 64.05 | 0.53463 |
| 46 | ∞ | 5.335 | | | |

TABLE 6

Example 2

| | Wide-Angle End | First Middle | Second Middle | Telephoto End |
|---|---|---|---|---|
| Zr | 1.0 | 2.0 | 4.0 | 22.1 |
| f | 7.913 | 15.743 | 31.321 | 174.873 |
| FNo. | 1.85 | 1.85 | 1.85 | 2.76 |
| 2ω(°) | 76.0 | 37.8 | 19.6 | 3.6 |
| DD[10] | 0.500 | 22.451 | 39.460 | 58.587 |
| DD[21] | 77.262 | 36.333 | 16.726 | 2.104 |
| DD[24] | 1.927 | 9.523 | 13.688 | 0.755 |

TABLE 7

Example 2

| Surface Number | 2 | 7 | 10 |
|---|---|---|---|
| KA | 1.0000000E+00 | 1.0000000E+00 | 1.0000000E+00 |
| A3 | 5.8991572E−23 | 0.0000000E+00 | 0.0000000E+00 |
| A4 | 3.2428342E−08 | 2.1807754E−07 | 1.6388592E−07 |
| A5 | 1.5558006E−09 | 2.6788193E−09 | 1.0150882E−10 |
| A6 | −9.6159867E−11 | −6.2019710E−10 | −5.1987671E−10 |
| A7 | −7.5111202E−13 | −3.4353545E−12 | 3.7228437E−12 |
| A8 | 8.3554668E−14 | 5.0433282E−13 | 3.9429060E−13 |
| A9 | 8.1263462E−17 | 1.6408381E−15 | −3.3349139E−15 |
| A10 | −1.9826822E−17 | −1.1300300E−16 | −4.1999471E−17 |

| Surface Number | 12 | 33 |
|---|---|---|
| KA | 1.0000000E+00 | 1.0000000E+00 |
| A3 | −4.0728057E−21 | 0.0000000E+00 |
| A4 | −6.1795902E−06 | 1.2772995E−06 |
| A5 | 7.3511850E−07 | 5.8923355E−08 |
| A6 | −3.0524827E−08 | −1.2912307E−08 |
| A7 | 1.5397156E−09 | 4.9020346E−10 |
| A8 | −5.0613415E−10 | 2.4388498E−11 |
| A9 | −4.5681201E−11 | −2.1675219E−12 |
| A10 | 6.4195023E−12 | 4.3169756E−14 |

TABLE 8

Example 2

| Surface Number | 3 |
|---|---|
| P2 | −3.779753E−01 |
| P4 | 5.247913E−05 |
| P6 | −1.624030E−07 |
| P8 | 1.078017E−10 |

Example 3

Figure 5:
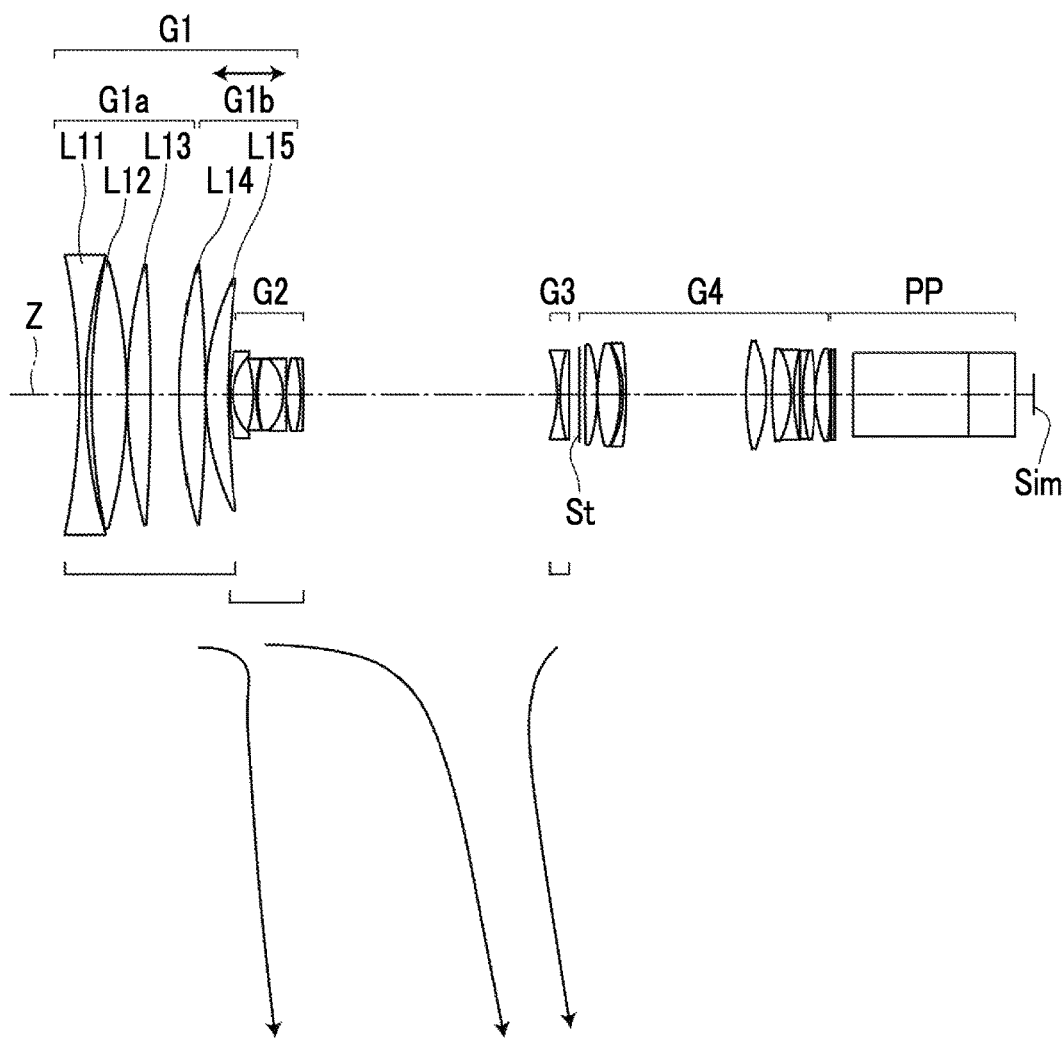
FIG. 5 is a cross-sectional view illustrating a lens configuration and a movement locus of a zoom lens of Example 3 of the present invention at the wide-angle end.
Figure 17:
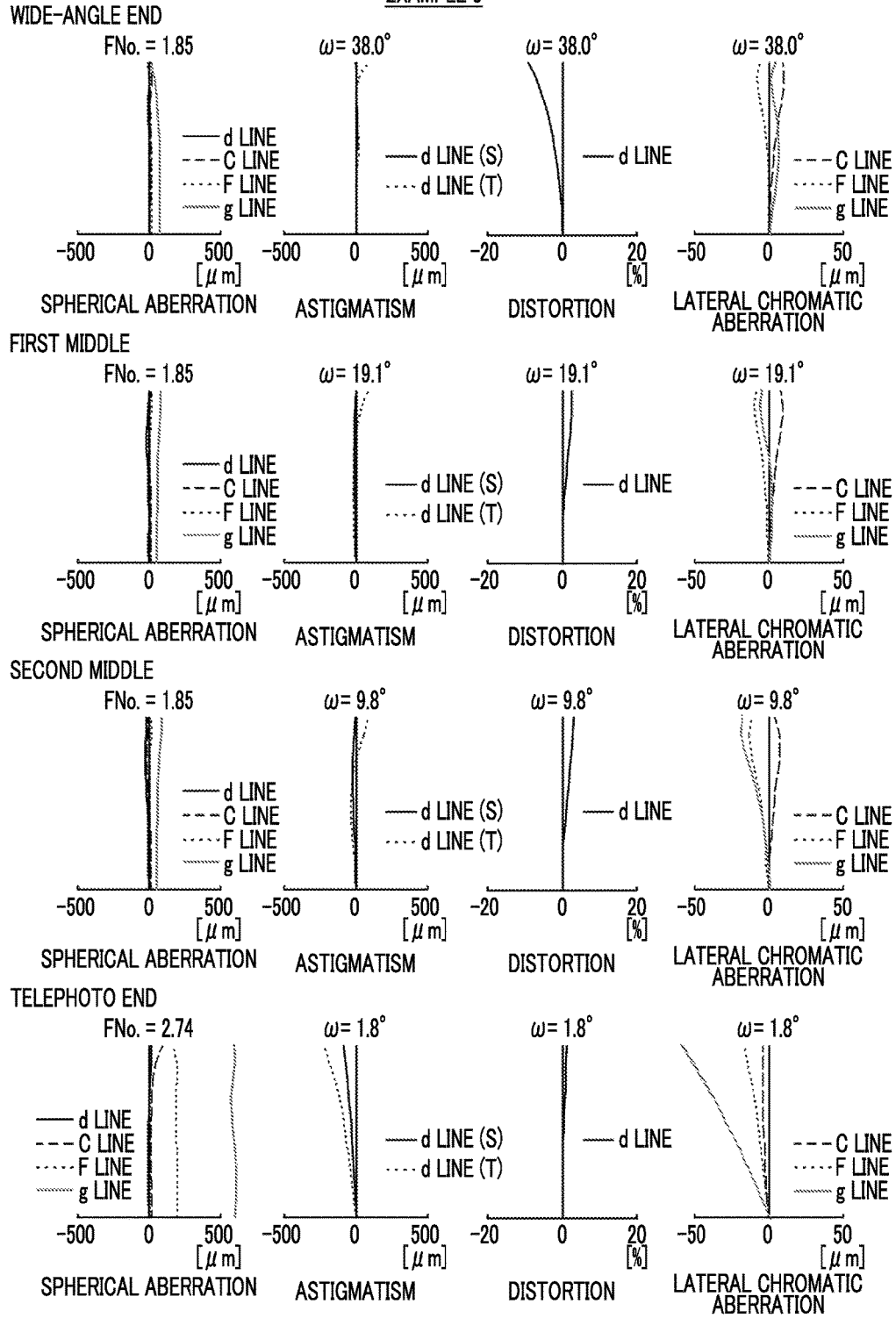
FIG. 17 is a diagram of aberrations of the zoom lens of Example 3 of the present invention.

FIG. 5 is a cross-sectional view illustrating a lens configuration of the zoom lens of Example 3 at the wide-angle end. FIG. 6 is a cross-sectional view illustrating a lens configuration and an optical path thereof at the respective states. The schematic configuration of the zoom lens of Example 3 is the same as that of Example 1. Table 9 shows basic lens data of the zoom lens of Example 3, Table 10 shows specification and variable surface distances, Table 11 shows aspheric coefficients, Table 12 shows diffractive surface coefficients, and FIG. 17 shows aberration diagrams in a state where the object at the infinity is in focus.

TABLE 9

Example 3

| Si | Ri | Di | Ndj | vdj | θgFj |
|---|---|---|---|---|---|
| 1 | −194.98861 | 1.800 | 1.80610 | 33.27 | 0.58845 |
| *2 | 143.58814 | 1.647 | | | |
| 3(DOE) | 193.52398 | 10.000 | 1.48749 | 70.24 | 0.53007 |
| 4 | −140.63611 | 0.121 | | | |
| 5 | 147.73161 | 6.856 | 1.43387 | 95.18 | 0.53733 |
| 6 | −534.62029 | 8.096 | | | |
| *7 | 136.38382 | 7.266 | 1.43387 | 95.18 | 0.53733 |
| 8 | −376.74378 | 0.120 | | | |
| 9 | 74.97458 | 6.402 | 1.77250 | 49.60 | 0.55212 |
| *10 | 255.64390 | DD[10] | | | |
| 11 | 66.23519 | 0.800 | 2.00069 | 25.46 | 0.61364 |
| *12 | 15.09054 | 5.860 | | | |
| 13 | −36.29986 | 0.800 | 1.88300 | 40.76 | 0.56679 |
| 14 | 32.46933 | 0.512 | | | |
| 15 | 40.32403 | 7.164 | 1.80809 | 22.76 | 0.63073 |
| 16 | −14.84042 | 0.800 | 1.81600 | 46.62 | 0.55675 |
| 17 | 469.38507 | 0.120 | | | |
| 18 | 40.09259 | 4.099 | 1.63854 | 55.38 | 0.54858 |
| 19 | −45.12386 | 0.800 | 1.88300 | 40.76 | 0.56679 |
| 20 | −174.86983 | DD[20] | | | |

TABLE 9-continued

Example 3

| Si | Ri | Di | Ndj | νdj | θgFj |
|---|---|---|---|---|---|
| 21 | −36.17474 | 0.810 | 1.65160 | 58.55 | 0.54267 |
| 22 | 48.42565 | 2.530 | 1.74077 | 27.79 | 0.60961 |
| 23 | 1693.91892 | DD[23] | | | |
| 24(St) | ∞ | 1.600 | | | |
| 25 | 440.05274 | 3.500 | 1.77250 | 49.60 | 0.55212 |
| 26 | −47.87305 | 0.120 | | | |
| 27 | 56.53926 | 6.391 | 1.49700 | 81.54 | 0.53748 |
| 28 | −38.35867 | 0.839 | 1.54490 | 25.24 | 0.75933 |
| 29 | −32.07206 | 0.800 | 1.88300 | 40.76 | 0.56679 |
| 30 | −120.29393 | 34.000 | | | |
| 31 | 72.29587 | 5.734 | 1.48749 | 70.24 | 0.53007 |
| *32 | −39.33246 | 1.642 | | | |
| 33 | 86.33255 | 5.347 | 1.48749 | 70.24 | 0.53007 |
| 34 | −29.69411 | 0.800 | 1.88300 | 40.76 | 0.56679 |
| 35 | 51.24248 | 1.752 | | | |
| 36 | 5692.37634 | 0.800 | 1.85025 | 30.05 | 0.59797 |
| 37 | 49.43036 | 3.579 | 1.66672 | 48.32 | 0.56101 |
| 38 | −88.47664 | 0.120 | | | |
| 39 | 35.38420 | 4.303 | 1.56384 | 60.67 | 0.54030 |
| 40 | −119.72939 | 0.120 | | | |
| 41 | ∞ | 1.000 | 1.51633 | 64.14 | 0.53531 |
| 42 | ∞ | 5.000 | | | |
| 43 | ∞ | 33.000 | 1.60859 | 46.44 | 0.56664 |
| 44 | ∞ | 13.200 | 1.51633 | 64.05 | 0.53463 |
| 45 | ∞ | 5.403 | | | |

TABLE 10

Example 3

| | Wide-Angle End | First Middle | Second Middle | Telephoto End |
|---|---|---|---|---|
| Zr | 1.0 | 2.0 | 4.0 | 22.1 |
| f | 7.919 | 15.755 | 31.345 | 175.006 |
| FNo. | 1.85 | 1.85 | 1.85 | 2.74 |
| 2ω(°) | 76.0 | 38.2 | 19.6 | 3.6 |
| DD[10] | 0.500 | 21.442 | 39.076 | 58.154 |
| DD[20] | 72.069 | 32.102 | 16.402 | 1.923 |
| DD[23] | 2.977 | 9.446 | 12.095 | 0.768 |

TABLE 11

Example 3

| Surface Number | 2 | 7 | 10 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | 6.8405909E−08 | 3.8770719E−07 | 2.5492852E−07 |
| A5 | −4.6005668E−09 | −3.5545186E−08 | −2.2702604E−08 |
| A6 | −1.0158668E−10 | −5.8803957E−10 | −6.0778453E−10 |
| A7 | 8.2760875E−12 | 3.9848367E−11 | 4.1927330E−11 |
| A8 | 1.1185153E−14 | 1.8735434E−13 | 7.7254376E−14 |
| A9 | −3.3048335E−15 | −1.2670010E−14 | −2.1102693E−14 |
| A10 | 2.7582048E−17 | 7.7752194E−17 | 2.3915357E−16 |

| Surface Number | 12 | 32 |
|---|---|---|
| KA | 1.0000000E+00 | 1.0000000E+00 |
| A3 | 1.6291543E−20 | 0.0000000E+00 |
| A4 | −4.8889927E−06 | 1.5044770E−06 |
| A5 | −1.1751206E−07 | 3.6104435E−08 |
| A6 | 1.5145625E−07 | −1.0415954E−08 |
| A7 | −1.9681847E−08 | 4.3847442E−10 |
| A8 | −4.2624754E−10 | 2.1056115E−11 |
| A9 | 1.4914262E−10 | −2.1220239E−12 |
| A10 | −5.6796031E−12 | 4.8306591E−14 |

TABLE 12

Example 3

| Surface Number | 3 |
|---|---|
| P2 | −3.216347E−01 |
| P4 | −1.345943E−05 |
| P6 | −1.380492E−07 |
| P8 | 1.135761E−10 |

Example 4

Figure 7:
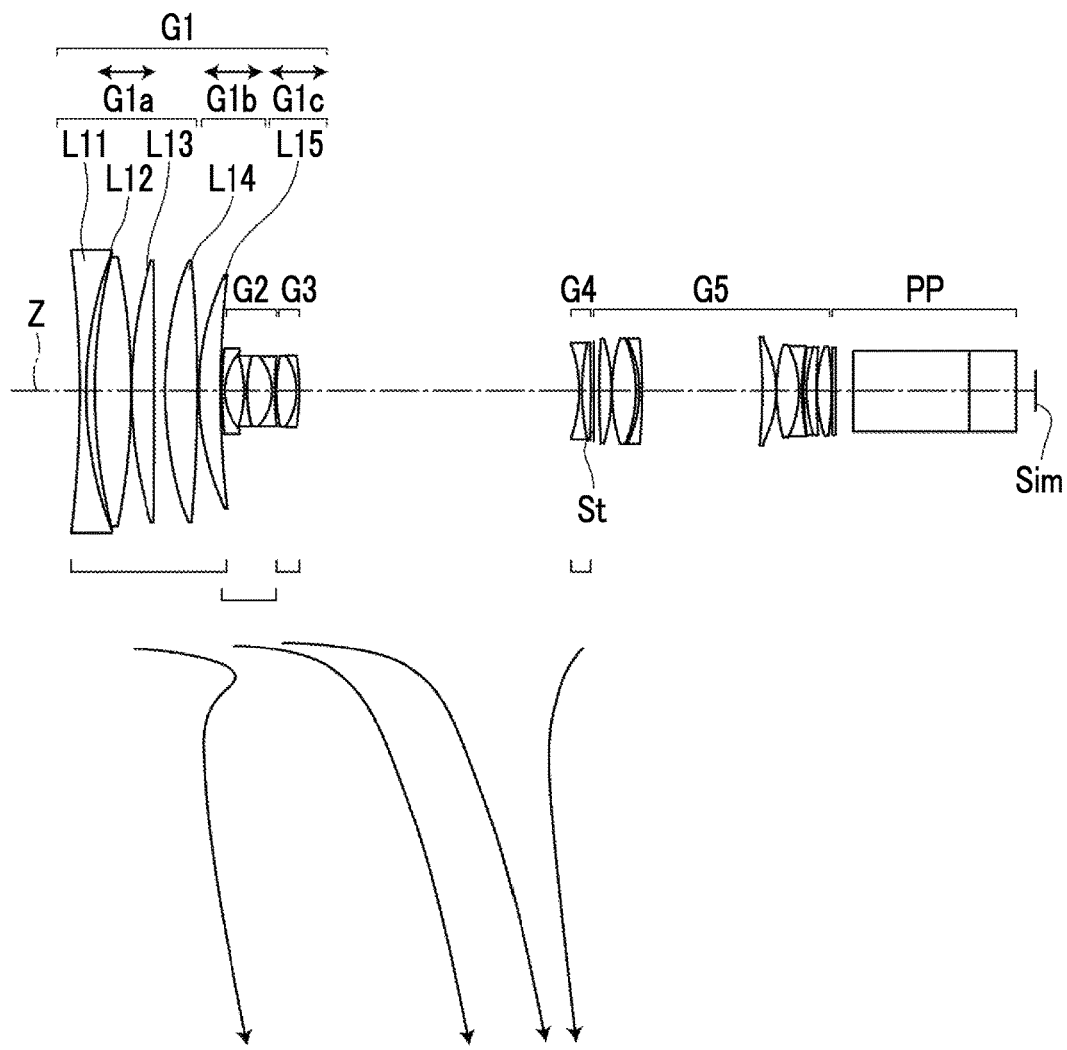
FIG. 7 is a cross-sectional view illustrating a lens configuration and a movement locus of a zoom lens of Example 4 of the present invention at the wide-angle end.

FIG. 7 is a cross-sectional view illustrating a lens configuration of the zoom lens of Example 4 at the wide-angle end. FIG. 8 is a cross-sectional view illustrating a lens configuration and an optical path thereof at the respective states. The zoom lens of Example 4 consists of, in order from the object side, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. The third lens group G3 corresponds to the intermediate positive lens group, the fourth lens group G4 corresponds to the image side negative lens group GN, and the fifth lens group G5 corresponds to the final lens group GE. During zooming, the first lens group G1, the second lens group G2, the third lens group G3, and the fourth lens group G4 move by changing relative distances between adjacent lens groups, and the fifth lens group G5 remains stationary with respect to the image plane Sim. The first lens group G1 consists of, in order from the object side, a first-a sub-lens group G1a, a first-b sub-lens group G1b, and a first-c sub-lens group G1c. The first-a sub-lens group G1a consists of, in order from the object side, lenses L11 to L13, the first-b sub-lens group G1b consists of a lens L14, and the first-c sub-lens group G1c consists of a lens L15. During focusing from the object at infinity to the close-range object, the first-a sub-lens group G1a, the first-b sub-lens group G1b, and the first-c sub-lens group G1c move in a state where a relative distance therebetween in the direction of the optical axis is set to be different. The above is a schematic configuration of the zoom lens of Example 4.

Figure 18:
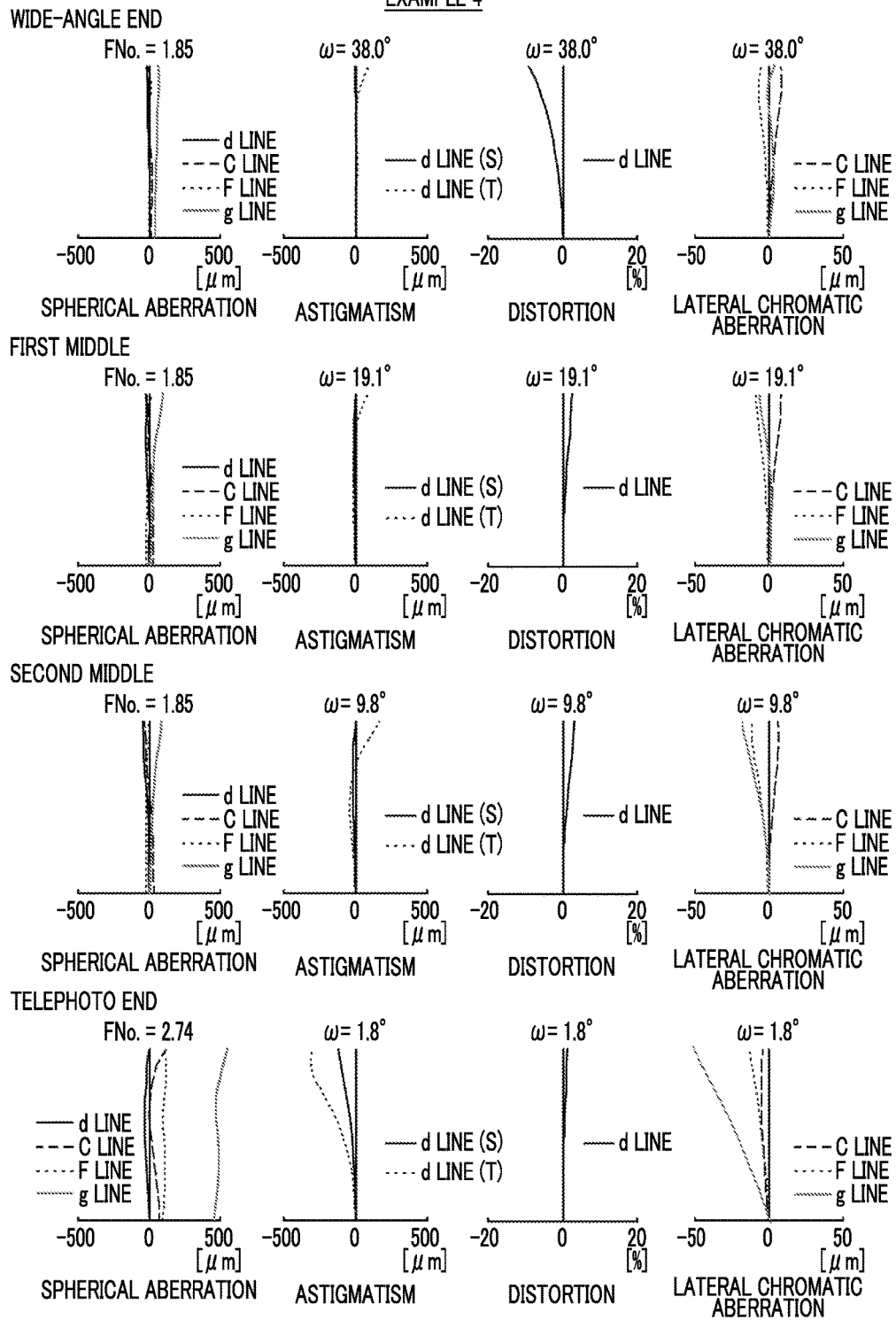
FIG. 18 is a diagram of aberrations of the zoom lens of Example 4 of the present invention.

Table 13 shows basic lens data of the zoom lens of Example 4, Table 14 shows specification and variable surface distances, Table 15 shows aspheric coefficients, Table 16 shows diffractive surface coefficients, and FIG. 18 shows aberration diagrams in a state where the object at the infinity is in focus.

TABLE 13

Example 4

| Si | Ri | Di | Ndj | νdj | θgFj |
|---|---|---|---|---|---|
| 1 | −332.11518 | 1.800 | 1.80610 | 33.27 | 0.58845 |
| *2 | 112.41082 | 2.463 | | | |
| 3 (DOE) | 158.09407 | 10.290 | 1.48749 | 70.24 | 0.53007 |
| 4 | −190.53136 | 0.120 | | | |
| 5 | 126.23069 | 6.531 | 1.43387 | 95.18 | 0.53733 |
| 6 | −5063.95915 | 3.120 | | | |
| *7 | 109.40425 | 9.131 | 1.43387 | 95.18 | 0.53733 |
| 8 | −409.06441 | 0.400 | | | |
| 9 | 78.44704 | 6.126 | 1.77250 | 49.60 | 0.55212 |
| *10 | 286.69167 | DD[10] | | | |
| 11 | 105.41918 | 0.800 | 2.00100 | 29.13 | 0.59952 |
| *12 | 15.52110 | 5.602 | | | |

TABLE 13-continued

Example 4

| Si | Ri | Di | Ndj | vdj | θgFj |
|---|---|---|---|---|---|
| 13 | −33.20540 | 0.800 | 1.77250 | 49.60 | 0.55212 |
| 14 | 37.21182 | 0.120 | | | |
| 15 | 37.98298 | 6.991 | 1.74077 | 27.79 | 0.60961 |
| 16 | −14.83395 | 0.800 | 1.75500 | 52.32 | 0.54765 |
| 17 | 106.21413 | DD[17] | | | |
| 18 | 46.76471 | 5.758 | 1.67270 | 32.10 | 0.59891 |
| 19 | −17.84680 | 0.800 | 1.85025 | 30.05 | 0.59797 |
| 20 | −65.74348 | DD[20] | | | |
| 21 | −39.56297 | 0.810 | 1.65160 | 58.55 | 0.54267 |
| 22 | 65.11440 | 2.448 | 1.74077 | 27.79 | 0.60961 |
| 23 | −627.31621 | DD[23] | | | |
| 24 (St) | ∞ | 1.600 | | | |
| 25 | 271.41749 | 3.476 | 1.77250 | 49.60 | 0.55212 |
| 26 | −52.56413 | 0.120 | | | |
| 27 | 50.99056 | 6.711 | 1.49700 | 81.54 | 0.53748 |
| 28 | −40.34901 | 1.000 | 1.54490 | 25.24 | 0.75933 |
| 29 | −34.35390 | 0.800 | 1.88300 | 40.76 | 0.56679 |
| 30 | −157.52130 | 34.000 | | | |
| 31 | −153.91327 | 3.884 | 1.48749 | 70.24 | 0.53007 |
| *32 | −30.55248 | 0.120 | | | |
| 33 | 47.16425 | 6.347 | 1.48749 | 70.24 | 0.53007 |
| 34 | −29.55206 | 0.800 | 1.88300 | 40.76 | 0.56679 |
| 35 | 64.21436 | 0.508 | | | |
| 36 | 85.88769 | 0.800 | 1.85025 | 30.05 | 0.59797 |
| 37 | 37.73774 | 3.010 | 1.66672 | 48.32 | 0.56101 |
| 38 | 169.08170 | 0.120 | | | |
| 39 | 38.48283 | 4.146 | 1.56384 | 60.67 | 0.54030 |
| 40 | −87.19160 | 0.120 | | | |
| 41 | ∞ | 1.000 | 1.51633 | 64.14 | 0.53531 |
| 42 | ∞ | 5.000 | | | |
| 43 | ∞ | 33.000 | 1.60859 | 46.44 | 0.56664 |
| 44 | ∞ | 13.200 | 1.51633 | 64.05 | 0.53463 |
| 45 | ∞ | 5.481 | | | |

TABLE 14

Example 4

| | Wide-Angle End | First Middle | Second Middle | Telephoto End |
|---|---|---|---|---|
| Zr | 1.0 | 2.0 | 4.0 | 22.1 |
| f | 7.917 | 15.752 | 31.339 | 174.973 |
| FNo. | 1.85 | 1.85 | 1.85 | 2.74 |
| 2ω(°) | 76.0 | 38.2 | 19.6 | 3.6 |
| DD[10] | 0.400 | 19.427 | 37.963 | 57.569 |
| DD[17] | 0.400 | 1.761 | 1.736 | 1.184 |
| DD[20] | 78.960 | 30.264 | 14.337 | 1.821 |
| DD[23] | 0.819 | 9.482 | 12.679 | 0.344 |

TABLE 15

Example 4

| | Surface Number | | |
|---|---|---|---|
| | 2 | 7 | 10 |
| KA | 1.0000000E+00 | 1.0000000E+00 | 1.0000000E+00 |
| A3 | 0.0000000E+00 | 0.0000000E+00 | 0.0000000E+00 |
| A4 | 2.8379900E−07 | 8.5382420E−07 | 4.0282921E−07 |
| A5 | −1.7037936E−08 | −5.7797972E−08 | −2.8875047E−08 |
| A6 | −1.2728650E−10 | −7.7708122E−10 | −7.9441055E−10 |
| A7 | 2.2186862E−11 | 7.2451132E−11 | 6.1811388E−11 |
| A8 | −1.2056596E−13 | −1.0647463E−13 | −9.6133248E−14 |
| A9 | −7.4104447E−15 | −2.4156436E−14 | −3.2639305E−14 |
| A10 | 9.0356990E−17 | 2.7907390E−16 | 4.6553191E−16 |

| | Surface Number | |
|---|---|---|
| | 12 | 32 |
| KA | 1.0000000E+00 | 1.0000000E+00 |
| A3 | −3.2583086E−20 | 0.0000000E+00 |
| A4 | −9.7890509E−06 | 2.3439079E−06 |
| A5 | −1.0659482E−07 | 3.7229675E−08 |
| A6 | 2.1500244E−07 | −8.2090275E−09 |
| A7 | −4.1158088E−08 | 2.4203448E−10 |
| A8 | 5.6579093E−10 | 2.2687814E−11 |
| A9 | 2.6833970E−10 | −1.1989423E−12 |
| A10 | −1.5087545E−11 | 1.5226068E−14 |

TABLE 16

Example 4

| | Surface Number 3 |
|---|---|
| P2 | −3.322620E−01 |
| P4 | −1.038502E−04 |
| P6 | −5.681789E−08 |
| P8 | 9.359515E−11 |

Example 5

Figure 9:
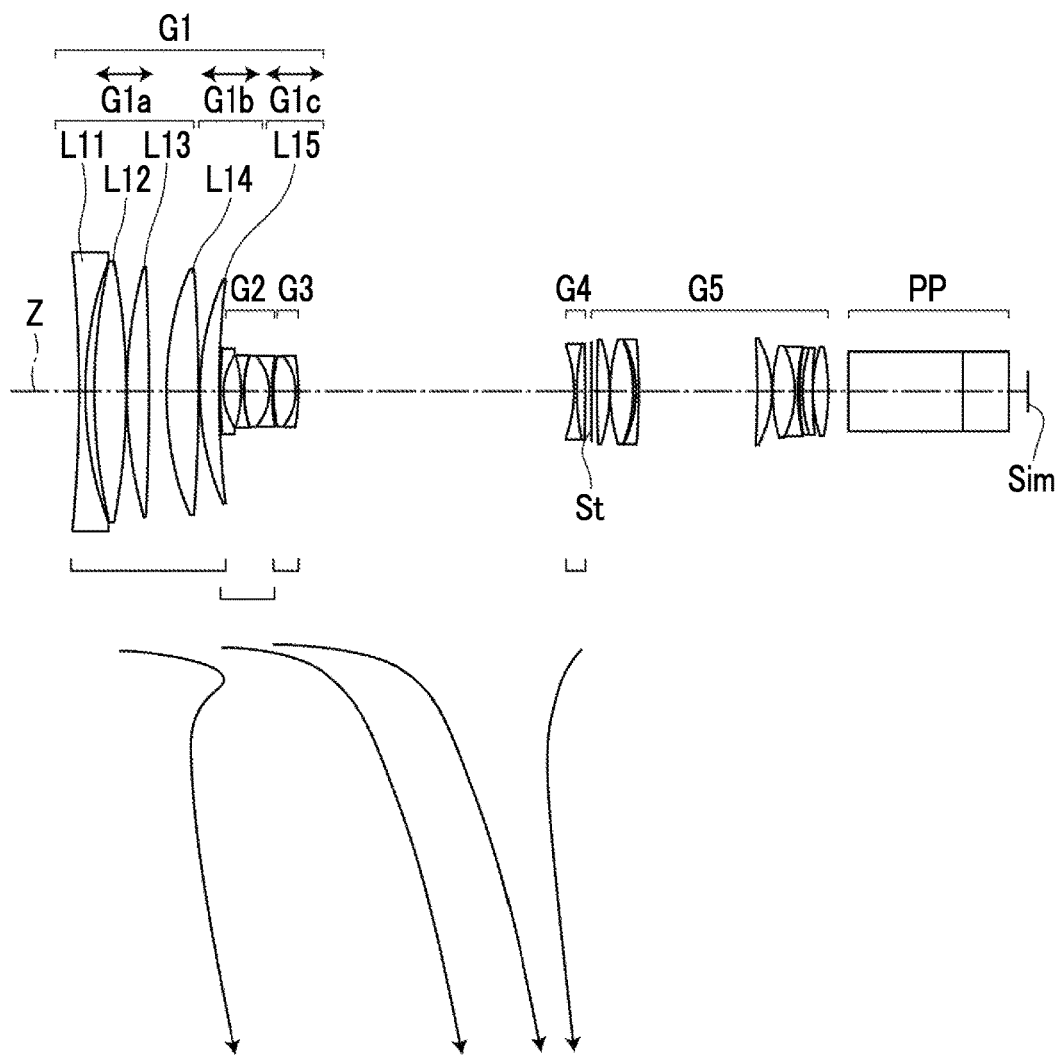
FIG. 9 is a cross-sectional view illustrating a lens configuration and a movement locus of a zoom lens of Example 5 of the present invention at the wide-angle end.
Figure 19:
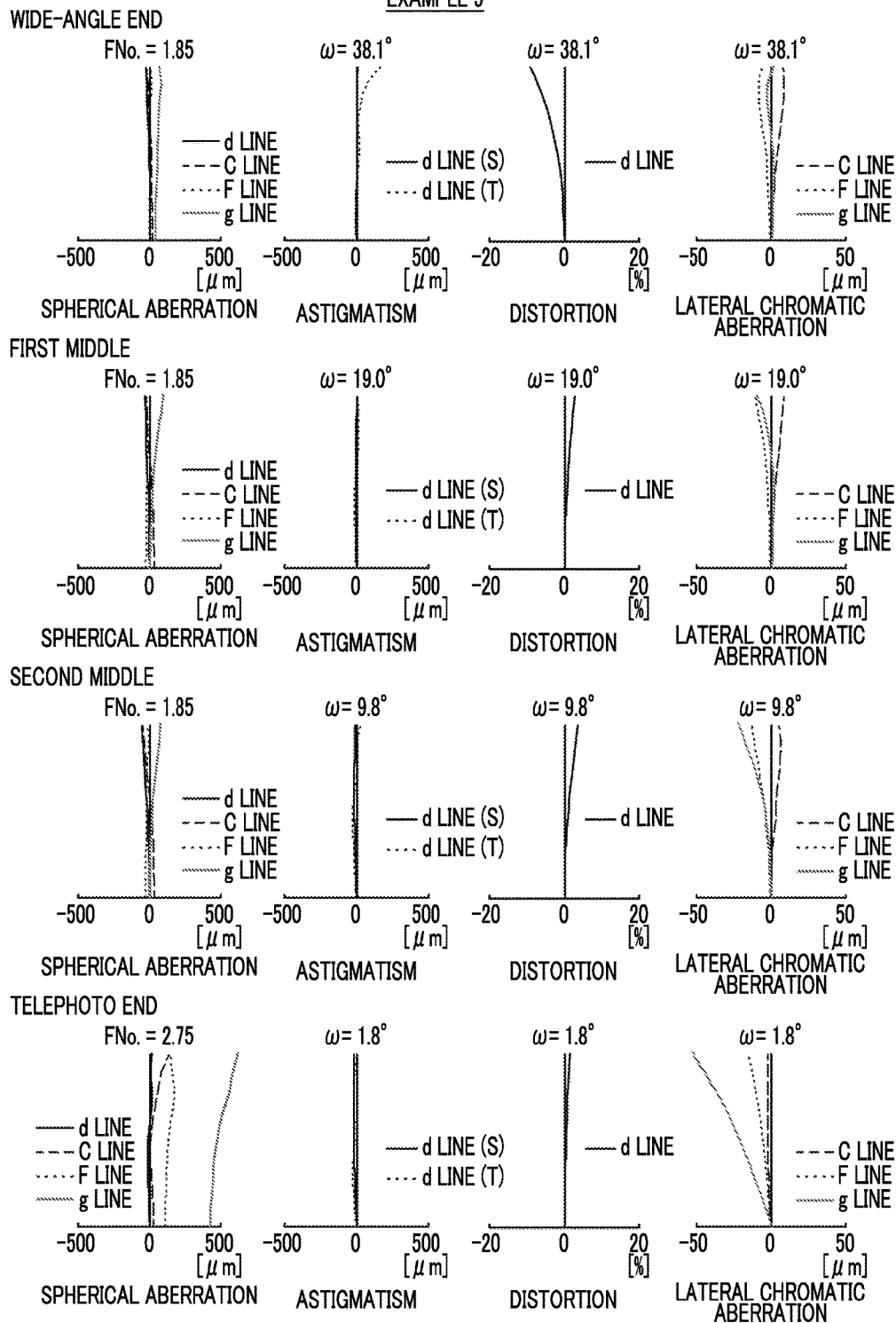
FIG. 19 is a diagram of aberrations of the zoom lens of Example 5 of the present invention.

FIG. 9 is a cross-sectional view illustrating a lens configuration of the zoom lens of Example 5 at the wide-angle end. FIG. 10 is a cross-sectional view illustrating a lens configuration and an optical path thereof at the respective states. The schematic configuration of the zoom lens of Example 5 is the same as that of Example 4. Table 17 shows basic lens data of the zoom lens of Example 5, Table 18 shows specification and variable surface distances, Table 19 shows aspheric coefficients, Table 20 shows diffractive surface coefficients, and FIG. 19 shows aberration diagrams in a state where the object at the infinity is in focus.

TABLE 17

Example 5

| Si | Ri | Di | Ndj | vdj | θgFj |
|---|---|---|---|---|---|
| 1 | −417.71636 | 1.800 | 1.80610 | 33.27 | 0.58845 |
| *2 | 115.53204 | 2.586 | | | |
| 3 (DOE) | 168.96456 | 9.160 | 1.48749 | 70.24 | 0.53007 |
| 4 | −203.00693 | 0.120 | | | |
| 5 | 135.25260 | 6.612 | 1.43387 | 95.18 | 0.53733 |
| 6 | −707.06457 | 4.983 | | | |
| *7 | 106.17784 | 9.193 | 1.43387 | 95.18 | 0.53733 |
| 8 | −487.48024 | 0.403 | | | |
| 9 | 82.10135 | 5.516 | 1.77250 | 49.60 | 0.55212 |
| *10 | 295.34949 | DD[10] | | | |
| 11 | 171.33895 | 0.800 | 2.00100 | 29.13 | 0.59952 |
| *12 | 16.82816 | 5.205 | | | |
| 13 | −35.65075 | 0.800 | 1.77250 | 49.60 | 0.55212 |
| 14 | 32.78298 | 0.120 | | | |
| 15 | 32.90330 | 7.203 | 1.74077 | 27.79 | 0.60961 |
| 16 | −15.47135 | 0.800 | 1.75500 | 52.32 | 0.54765 |
| 17 | 69.22188 | DD[17] | | | |
| 18 | 45.99843 | 6.410 | 1.67270 | 32.10 | 0.59891 |
| 19 | −15.83382 | 0.800 | 1.85025 | 30.05 | 0.59797 |
| 20 | −58.15557 | DD[20] | | | |
| 21 | −38.57117 | 0.810 | 1.65160 | 58.55 | 0.54267 |
| 22 | 68.39761 | 2.413 | 1.74077 | 27.79 | 0.60961 |
| 23 | −425.54238 | DD[23] | | | |
| 24 (St) | ∞ | 1.600 | | | |
| 25 | 402.23429 | 3.605 | 1.77250 | 49.60 | 0.55212 |
| 26 | −48.53103 | 0.120 | | | |

TABLE 17-continued

Example 5

| Si | Ri | Di | Ndj | vdj | θgFj |
|---|---|---|---|---|---|
| 27 | 50.65829 | 6.630 | 1.49700 | 81.54 | 0.53748 |
| 28 | −40.07988 | 0.808 | 1.54490 | 25.24 | 0.75933 |
| 29 | −33.79885 | 0.800 | 1.88300 | 40.76 | 0.56679 |
| 30 | −176.94373 | 34.000 | | | |
| 31 | −259.90849 | 4.220 | 1.48749 | 70.24 | 0.53007 |
| *32 | −30.70094 | 0.182 | | | |
| 33 | 48.24729 | 6.369 | 1.48749 | 70.24 | 0.53007 |
| 34 | −29.28349 | 0.800 | 1.88300 | 40.76 | 0.56679 |
| 35 | 57.03841 | 0.587 | | | |
| 36 | 80.23916 | 0.800 | 1.85025 | 30.05 | 0.59797 |
| 37 | 39.72481 | 3.010 | 1.66672 | 48.32 | 0.56101 |
| 38 | 109.00174 | 0.120 | | | |
| 39 | 39.69838 | 4.408 | 1.56384 | 60.67 | 0.54030 |
| 40 | −65.40862 | 5.800 | | | |
| 41 | ∞ | 33.000 | 1.60859 | 46.44 | 0.56664 |
| 42 | ∞ | 13.200 | 1.51633 | 64.05 | 0.53463 |
| 43 | ∞ | 5.457 | | | |

TABLE 18

Example 5

| | Wide-Angle End | First Middle | Second Middle | Telephoto End |
|---|---|---|---|---|
| Zr | 1.0 | 2.0 | 4.0 | 22.1 |
| f | 7.921 | 15.759 | 31.353 | 175.050 |
| FNo. | 1.85 | 1.85 | 1.85 | 2.75 |
| 2ω(°) | 76.2 | 38.0 | 19.6 | 3.6 |
| DD[10] | 0.400 | 18.213 | 37.135 | 56.834 |
| DD[17] | 0.400 | 2.510 | 2.586 | 2.199 |
| DD[20] | 78.877 | 28.214 | 13.348 | 1.836 |
| DD[23] | 1.779 | 10.588 | 13.382 | 0.403 |

TABLE 19

Example 5

| | Surface Number | | |
|---|---|---|---|
| | 2 | 7 | 10 |
| KA | 1.0000000E+00 | 1.0000000E+00 | 1.0000000E+00 |
| A3 | 0.0000000E+00 | 1.5807001E−21 | 1.2067809E−21 |
| A4 | 6.8477685E−08 | 1.2540946E−07 | 5.2707629E−08 |
| A5 | 2.3850336E−09 | −9.4674820E−09 | −8.9646127E−09 |
| A6 | −1.8338439E−11 | −3.2468612E−12 | −1.7737089E−10 |
| A7 | 3.7816042E−12 | 2.6769658E−11 | 2.8202473E−11 |
| A8 | −4.0480672E−14 | −2.1449085E−13 | −2.0637790E−13 |
| A9 | −2.1880683E−15 | −9.4616893E−15 | −1.3780127E−14 |
| A10 | 3.7436051E−17 | 1.8750149E−16 | 2.6633365E−16 |

| | Surface Number | |
|---|---|---|
| | 12 | 32 |
| KA | 1.0000000E+00 | 1.0000000E+00 |
| A3 | 0.0000000E+00 | −6.6204081E−21 |
| A4 | −1.1025943E−05 | 2.9709746E−06 |
| A5 | −1.2873608E−06 | −9.9689774E−09 |
| A6 | 4.5838517E−07 | 1.6793653E−09 |
| A7 | −5.5888886E−08 | −4.9349277E−10 |
| A8 | −3.9404735E−10 | 2.1968477E−11 |
| A9 | 3.9932897E−10 | 9.2220465E−13 |
| A10 | −1.8598855E−11 | −4.7270526E−14 |

TABLE 20

Example 5

| | Surface Number 3 |
|---|---|
| P2 | −4.417308E−01 |
| P4 | −5.636562E−05 |
| P6 | 5.016830E−08 |
| P8 | 3.596084E−11 |

Example 6

Figure 11:
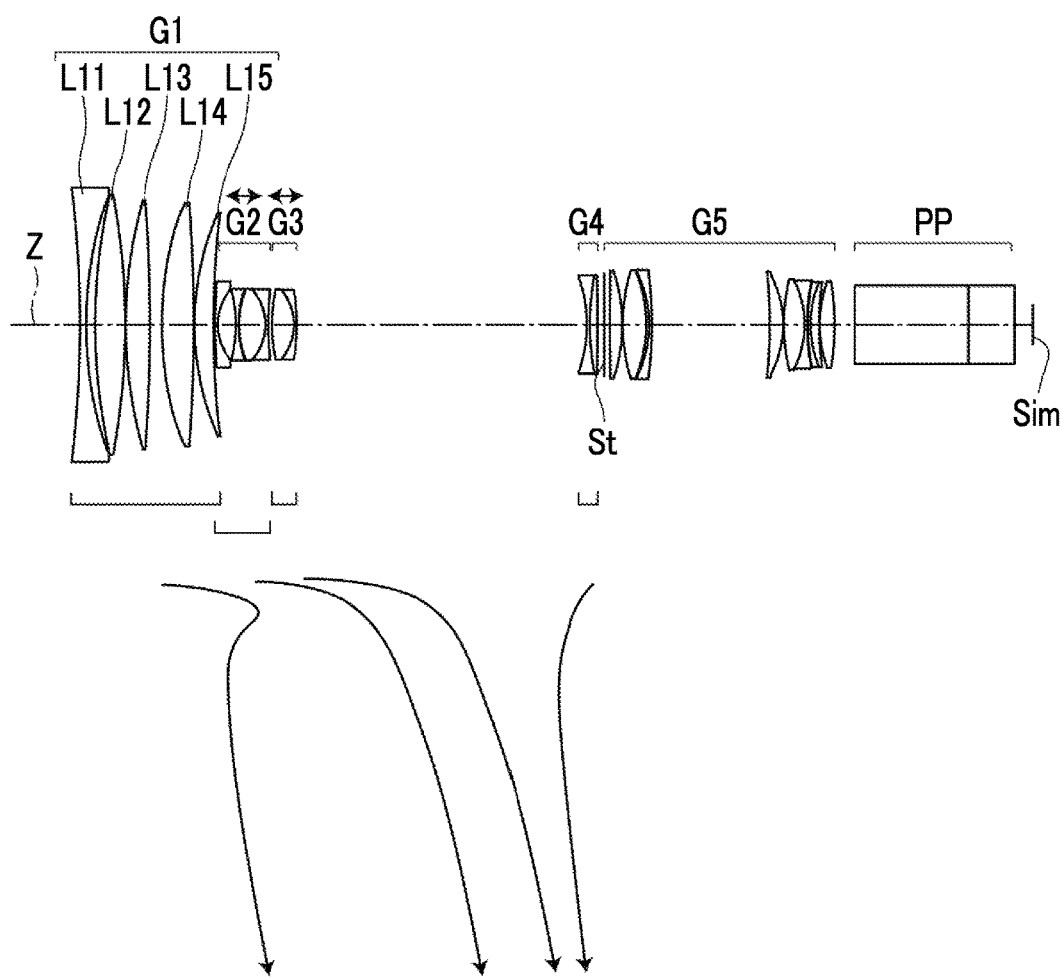
FIG. 11 is a cross-sectional view illustrating a lens configuration and a movement locus of a zoom lens of Example 6 of the present invention at the wide-angle end.
Figure 20:
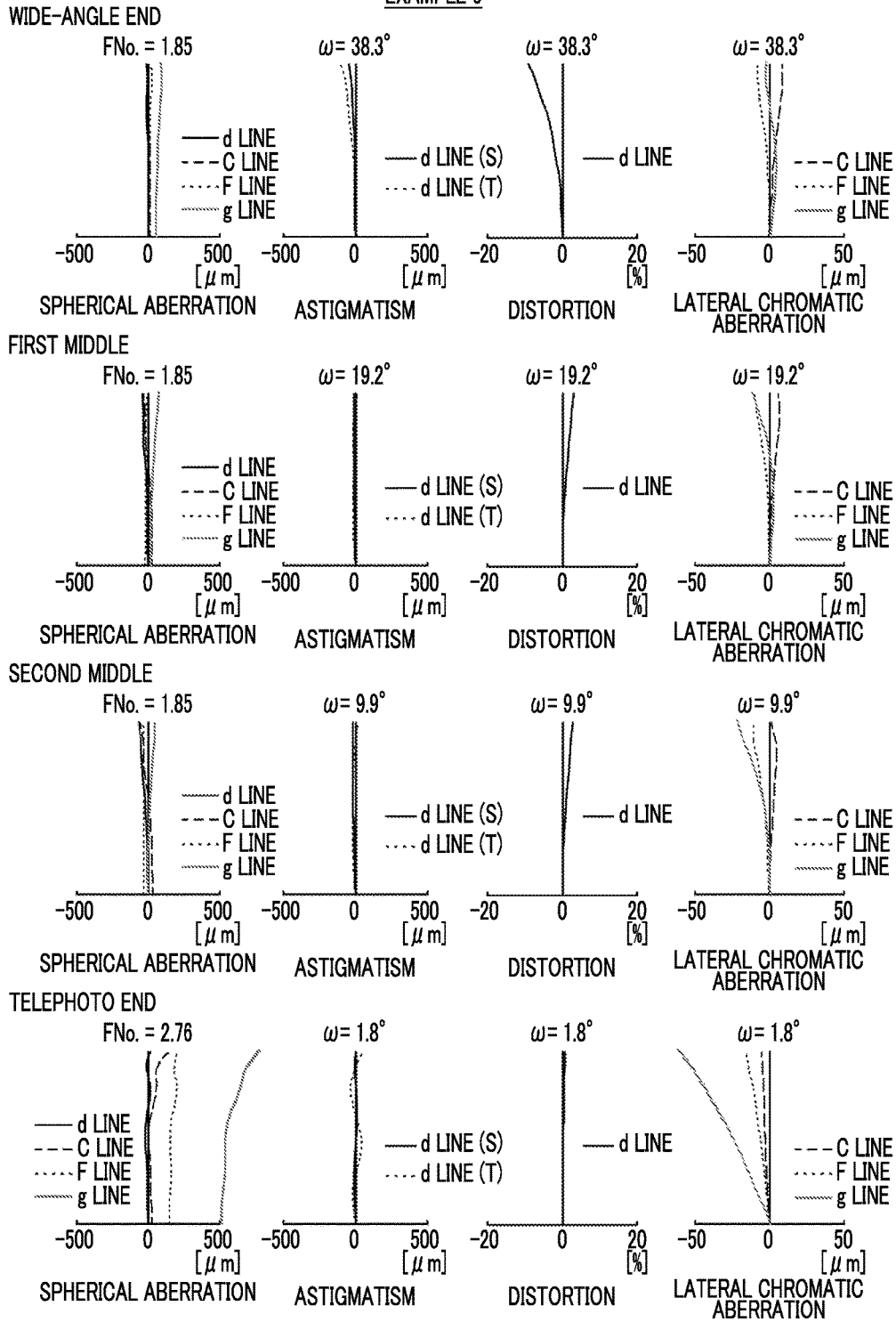
FIG. 20 is a diagram of aberrations of the zoom lens of Example 6 of the present invention.

FIG. 11 is a cross-sectional view illustrating a lens configuration of the zoom lens of Example 6 at the wide-angle end. FIG. 12 is a cross-sectional view illustrating a lens configuration and an optical path thereof at the respective states. The zoom lens of Example 6 is different from that of Example 4 in that the second lens group G2 and the third lens group G3 move in a state where a relative distance therebetween in the direction of the optical axis is set to be different during focusing from the object at infinity to the close-range object, and the other schematic configuration is the same as that of Example 4. Table 21 shows basic lens data of the zoom lens of Example 6, Table 22 shows specification and variable surface distances, Table 23 shows aspheric coefficients, Table 24 shows diffractive surface coefficients, and FIG. 20 shows aberration diagrams in a state where the object at the infinity is in focus.

TABLE 21

Example 6

| Si | Ri | Di | Ndj | vdj | θgFj |
|---|---|---|---|---|---|
| 1 | −328.67433 | 1.801 | 1.80610 | 33.27 | 0.58845 |
| *2 | 120.97265 | 2.555 | | | |
| 3 (DOE) | 169.26282 | 8.682 | 1.48749 | 70.24 | 0.53007 |
| 4 | −202.01927 | 0.120 | | | |
| 5 | 132.90862 | 7.182 | 1.43387 | 95.18 | 0.53733 |
| 6 | −498.13466 | 3.501 | | | |
| *7 | 109.30254 | 9.146 | 1.43387 | 95.18 | 0.53733 |
| 8 | −481.10621 | 0.191 | | | |
| 9 | 80.70800 | 5.508 | 1.77250 | 49.60 | 0.55212 |
| *10 | 285.18351 | DD[10] | | | |
| 11 | 152.79656 | 0.800 | 2.00100 | 29.13 | 0.59952 |
| *12 | 15.38837 | 5.405 | | | |
| 13 | −39.50983 | 0.800 | 1.77250 | 49.60 | 0.55212 |
| 14 | 30.85969 | 0.120 | | | |
| 15 | 28.14392 | 7.607 | 1.74077 | 27.79 | 0.60961 |
| 16 | −15.72965 | 0.800 | 1.75500 | 52.32 | 0.54765 |
| 17 | 97.97002 | DD[17] | | | |
| 18 | 51.03072 | 6.323 | 1.67270 | 32.10 | 0.59891 |
| 19 | −15.85714 | 0.800 | 1.85025 | 30.05 | 0.59797 |
| 20 | −67.30794 | DD[20] | | | |
| 21 | −40.67743 | 0.810 | 1.65160 | 58.55 | 0.54267 |
| 22 | 77.91235 | 2.249 | 1.74077 | 27.79 | 0.60961 |
| 23 | −505.67085 | DD[23] | | | |
| 24 (St) | ∞ | 1.600 | | | |
| 25 | 729.85152 | 3.599 | 1.77250 | 49.60 | 0.55212 |
| 26 | −48.94784 | 0.120 | | | |
| 27 | 54.54986 | 6.778 | 1.49700 | 81.54 | 0.53748 |
| 28 | −40.73468 | 0.811 | 1.54490 | 25.24 | 0.75933 |
| 29 | −34.32925 | 0.800 | 1.88300 | 40.76 | 0.56679 |
| 30 | −120.23821 | 34.000 | | | |
| 31 | −152.09778 | 3.932 | 1.48749 | 70.24 | 0.53007 |
| *32 | −29.87570 | 0.120 | | | |
| 33 | 56.15153 | 6.011 | 1.48749 | 70.24 | 0.53007 |
| 34 | −28.57321 | 0.800 | 1.88300 | 40.76 | 0.56679 |
| 35 | 59.30313 | 0.259 | | | |
| 36 | 64.99322 | 0.800 | 1.85025 | 30.05 | 0.59797 |
| 37 | 32.31189 | 2.517 | 1.66672 | 48.32 | 0.56101 |

TABLE 21-continued

Example 6

| Si | Ri | Di | Ndj | vdj | θgFj |
|---|---|---|---|---|---|
| 38 | 96.08148 | 0.120 | | | |
| 39 | 36.98235 | 4.319 | 1.56384 | 60.67 | 0.54030 |
| 40 | −74.97010 | 5.800 | | | |
| 41 | ∞ | 33.000 | 1.60859 | 46.44 | 0.56664 |
| 42 | ∞ | 13.200 | 1.51633 | 64.05 | 0.53463 |
| 43 | ∞ | 5.316 | | | |

TABLE 22

Example 6

| | Wide-Angle End | First Middle | Second Middle | Telephoto End |
|---|---|---|---|---|
| Zr | 1.0 | 2.0 | 4.0 | 22.1 |
| f | 7.851 | 15.621 | 31.078 | 173.518 |
| FNo. | 1.85 | 1.85 | 1.85 | 2.76 |
| 2ω(°) | 76.6 | 38.4 | 19.8 | 3.6 |
| DD[10] | 0.400 | 21.305 | 38.018 | 56.636 |
| DD[17] | 1.090 | 2.587 | 3.085 | 3.210 |
| DD[20] | 83.581 | 40.427 | 20.180 | 7.210 |
| DD[23] | 1.910 | 8.928 | 12.563 | 0.135 |

TABLE 23

Example 6

| | Surface Number | | |
|---|---|---|---|
| | 2 | 7 | 10 |
| KA | 1.0000000E+00 | 1.0000000E+00 | 1.0000000E+00 |
| A3 | −1.2584869E−21 | 0.0000000E+00 | −2.4135619E−21 |
| A4 | 1.5484466E−07 | 5.4008194E−07 | 2.9680582E−07 |
| A5 | 4.9716386E−09 | −3.4339840E−08 | −3.1547306E−08 |
| A6 | −2.4198124E−10 | −1.6136986E−10 | −2.5074693E−10 |
| A7 | 6.3397671E−12 | 5.4079894E−11 | 6.2771036E−11 |
| A8 | 9.1602244E−14 | −3.4474328E−13 | −5.7936693E−13 |
| A9 | −3.9090222E−15 | −1.7291321E−14 | −2.9311257E−14 |
| A10 | 2.4814634E−17 | 2.9376432E−16 | 5.7076508E−16 |

| | Surface Number | |
|---|---|---|
| | 12 | 32 |
| KA | 1.0000000E+00 | 1.0000000E+00 |
| A3 | 0.0000000E+00 | 4.4136054E−21 |
| A4 | −1.4099389E−05 | 3.0624086E−06 |
| A5 | −9.4737492E−07 | −3.2722449E−08 |
| A6 | 4.6528447E−07 | 7.3792454E−09 |
| A7 | −7.1706346E−08 | −9.5733458E−10 |
| A8 | 4.5666851E−10 | 2.6443872E−11 |
| A9 | 5.1052474E−10 | 2.4917324E−12 |
| A10 | −2.7986290E−11 | −1.0538484E−13 |

[Table 24]

TABLE 24

Example 6

| | Surface Number 3 |
|---|---|
| P2 | −4.037913E−01 |
| P4 | −3.954032E−05 |
| P6 | 1.682919E−08 |
| P8 | 6.059582E−11 |

Example 7

Figure 13:
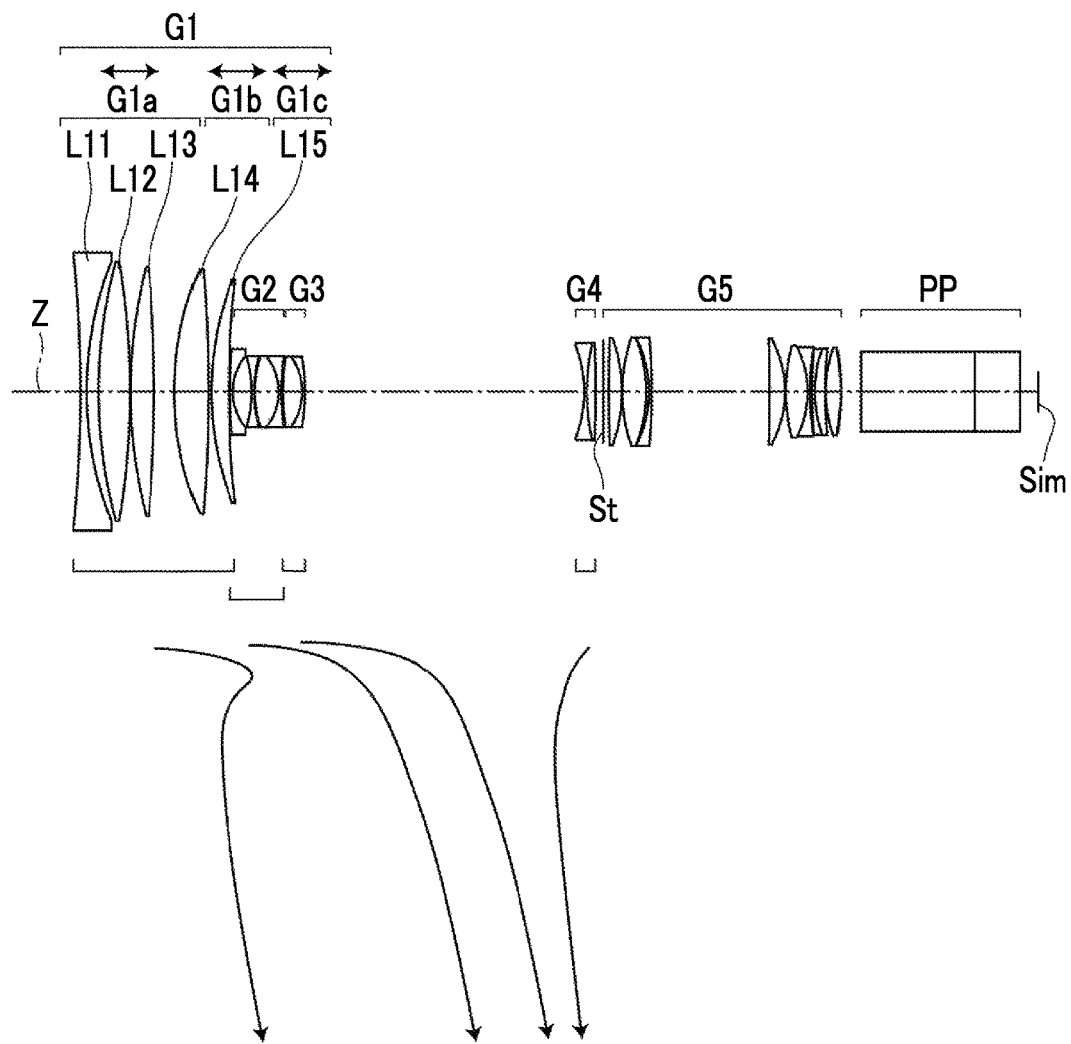
FIG. 13 is a cross-sectional view illustrating a lens configuration and a movement locus of a zoom lens of Example 7 of the present invention at the wide-angle end.
Figure 21:
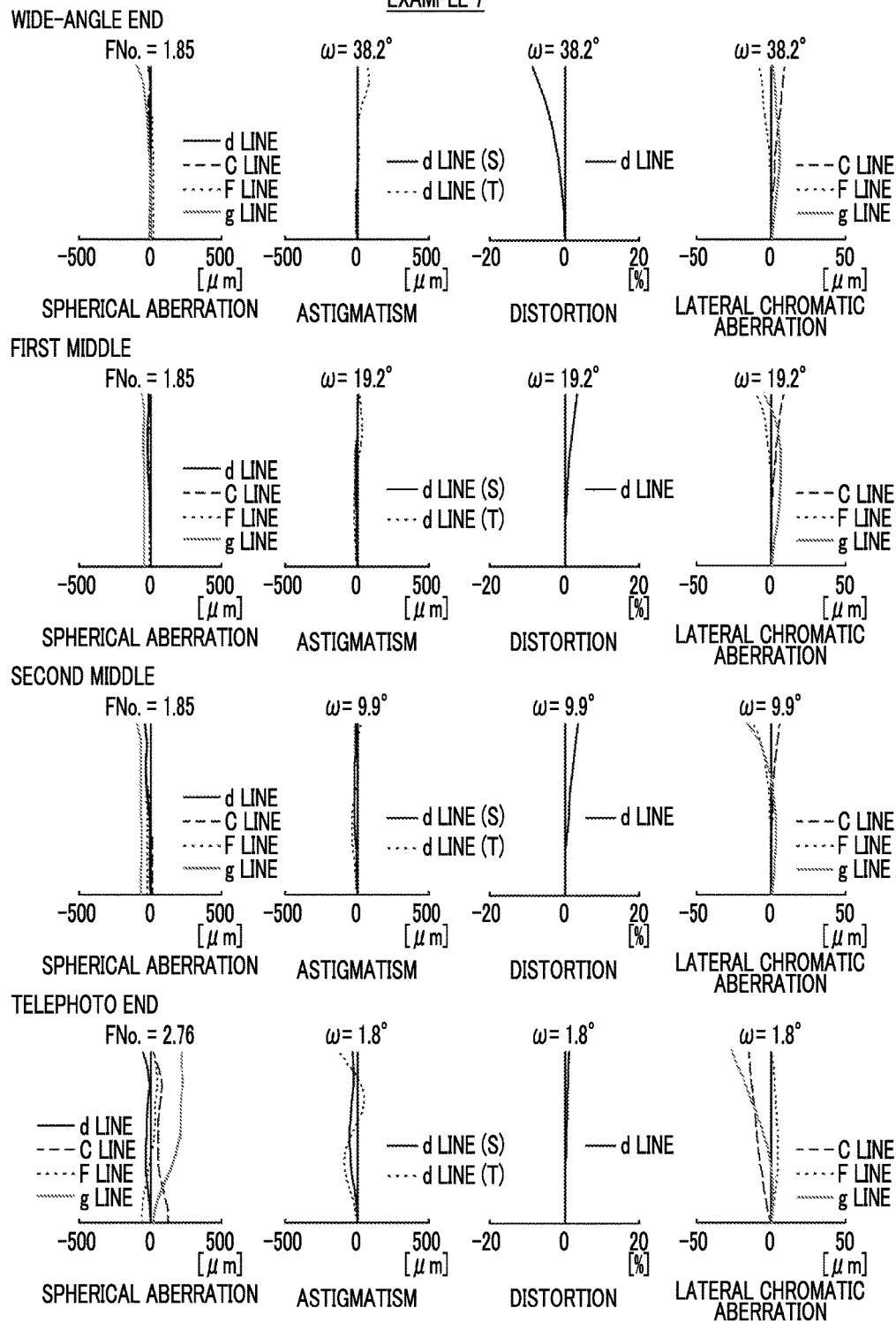
FIG. 21 is a diagram of aberrations of the zoom lens of Example 7 of the present invention.

FIG. 13 is a cross-sectional view illustrating a lens configuration of the zoom lens of Example 7 at the wide-angle end. FIG. 14 is a cross-sectional view illustrating a lens configuration and an optical path thereof at the respective states. The schematic configuration of the zoom lens of Example 7 is the same as that of Example 4. Table 25 shows basic lens data of the zoom lens of Example 7, Table 26 shows specification and variable surface distances, Table 27 shows aspheric coefficients, and FIG. 21 shows aberration diagrams in a state where the object at infinity is in focus.

TABLE 25

Example 7

| Si | Ri | Di | Ndj | vdj | θgFj |
|---|---|---|---|---|---|
| 1 | −387.56497 | 1.800 | 1.80610 | 33.27 | 0.58845 |
| *2 | 108.32050 | 3.402 | | | |
| 3 | 143.51818 | 9.107 | 1.48749 | 70.24 | 0.53007 |
| 4 | −223.78239 | 0.120 | | | |
| 5 | 144.15046 | 6.905 | 1.43387 | 95.18 | 0.53733 |
| 6 | −428.79442 | 5.986 | | | |
| *7 | 102.77162 | 9.695 | 1.43387 | 95.18 | 0.53733 |
| 8 | −436.40154 | 0.834 | | | |
| 9 | 88.92326 | 5.077 | 1.77250 | 49.60 | 0.55212 |
| *10 | 324.45503 | DD[10] | | | |
| 11 | 187.95959 | 0.800 | 2.00100 | 29.13 | 0.59952 |
| *12 | 15.99017 | 5.417 | | | |
| 13 | −37.37361 | 0.800 | 1.77250 | 49.60 | 0.55212 |
| 14 | 39.70660 | 0.120 | | | |
| 15 | 31.55908 | 6.894 | 1.74077 | 27.79 | 0.60961 |
| 16 | −16.58029 | 0.800 | 1.75500 | 52.32 | 0.54765 |
| 17 | 75.43441 | DD[17] | | | |
| 18 | 59.63390 | 5.668 | 1.67270 | 32.10 | 0.59891 |
| 19 | −16.99104 | 0.800 | 1.85025 | 30.05 | 0.59797 |
| 20 | −57.75344 | DD[20] | | | |
| 21 | −36.57080 | 0.810 | 1.65160 | 58.55 | 0.54267 |
| 22 | 61.78716 | 2.516 | 1.74077 | 27.79 | 0.60961 |
| 23 | −598.61946 | DD[23] | | | |
| 24 (St) | ∞ | 1.600 | | | |
| 25 | 569.91077 | 3.761 | 1.77250 | 49.60 | 0.55212 |
| 26 | −46.39010 | 0.120 | | | |
| 27 | 47.97805 | 6.869 | 1.49700 | 81.54 | 0.53748 |
| 28 | −41.86121 | 0.830 | 1.54490 | 25.24 | 0.75933 |
| 29 | −33.91610 | 0.800 | 1.88300 | 40.76 | 0.56679 |
| 30 | −169.79030 | 34.000 | | | |
| 31 | −598.98461 | 4.495 | 1.48749 | 70.24 | 0.53007 |
| *32 | −30.57942 | 0.194 | | | |
| 33 | 50.76038 | 6.297 | 1.48749 | 70.24 | 0.53007 |
| 34 | −28.93711 | 0.800 | 1.88300 | 40.76 | 0.56679 |
| 35 | 72.76787 | 0.648 | | | |
| 36 | 149.59005 | 0.800 | 1.85025 | 30.05 | 0.59797 |
| 37 | 37.20771 | 3.010 | 1.66672 | 48.32 | 0.56101 |
| 38 | 140.54494 | 0.120 | | | |
| 39 | 38.04063 | 4.179 | 1.56384 | 60.67 | 0.54030 |
| 40 | −78.57244 | 5.800 | | | |
| 41 | ∞ | 33.000 | 1.60859 | 46.44 | 0.56664 |
| 42 | ∞ | 13.200 | 1.51633 | 64.05 | 0.53463 |
| 43 | ∞ | 5.259 | | | |

TABLE 26

Example 7

| | Wide-Angle End | First Middle | Second Middle | Telephoto End |
|---|---|---|---|---|
| Zr | 1.0 | 2.0 | 4.0 | 22.1 |
| f | 7.834 | 15.587 | 31.010 | 173.137 |
| FNo. | 1.85 | 1.85 | 1.85 | 2.76 |
| 2ω(°) | 76.4 | 38.4 | 19.8 | 3.6 |
| DD[10] | 0.400 | 19.457 | 38.284 | 59.142 |
| DD[17] | 0.400 | 2.803 | 3.305 | 3.866 |
| DD[20] | 80.708 | 31.896 | 13.993 | 1.119 |

TABLE 26-continued

Example 7

| | Wide-Angle End | First Middle | Second Middle | Telephoto End |
|---|---|---|---|---|
| DD[23] | 2.255 | 9.537 | 12.535 | 0.368 |

TABLE 27

Example 7

| | Surface Number | | |
|---|---|---|---|
| | 2 | 7 | 10 |
| KA | 1.0000000E+00 | 1.0000000E+00 | 1.0000000E+00 |
| A3 | 0.0000000E+00 | 6.3228002E-21 | 0.0000000E+00 |
| A4 | 7.2556854E-07 | 3.0665672E-06 | 1.6146392E-06 |
| A5 | -2.4332337E-08 | -1.0210050E-07 | -5.6233819E-08 |
| A6 | -2.5494577E-10 | -2.0129400E-09 | -1.9512702E-09 |
| A7 | 2.8293484E-11 | 1.3530987E-10 | 1.1394731E-10 |
| A8 | -2.2246814E-13 | -5.2868081E-13 | -1.8468380E-13 |
| A9 | -9.4615460E-15 | -4.8955246E-14 | -5.8070756E-14 |
| A10 | 1.4267474E-16 | 6.4920629E-16 | 7.8878727E-16 |

| | Surface Number | |
|---|---|---|
| | 12 | 32 |
| KA | 1.0000000E+00 | 1.0000000E+00 |
| A3 | -6.5166171E-20 | 5.5170068E-22 |
| A4 | -1.0780988E-05 | 3.3850602E-06 |
| A5 | -1.5780931E-06 | -5.5751013E-10 |
| A6 | 6.6014912E-07 | -1.4186950E-09 |
| A7 | -8.1447466E-08 | -2.4565620E-10 |
| A8 | -6.4325389E-10 | 2.1655033E-11 |
| A9 | 6.4615205E-10 | 4.5769735E-13 |
| A10 | -3.0051928E-11 | -3.5332040E-14 |

Table 28 shows values corresponding to Conditional Expressions (1) to (7) of the zoom lenses of Examples 1 to 5. The values shown in Table 28 are based on the d line.

TABLE 28

| Expression Number | Conditional Expression | Example 1 | Example 2 | Example 3 | Example 4 | Example 5 | Example 6 | Example 7 |
|---|---|---|---|---|---|---|---|---|
| (1) | fN/fw | -6.60 | -9.05 | -7.61 | -9.10 | -9.16 | -9.53 | -8.46 |
| (2) | |zr1/zr2| | 0.12 | 0.24 | 0.20 | 0.25 | 0.26 | 0.26 | 0.24 |
| (3) | fE/fw | 6.08 | 6.29 | 6.25 | 5.88 | 5.91 | 5.80 | 5.86 |
| (4) | |βNt/βNw| | 0.79 | 0.96 | 0.90 | 0.98 | 0.95 | 0.94 | 0.92 |
| (5) | vavep | 77.87 | 77.56 | 77.55 | 77.55 | 77.55 | 77.55 | 77.55 |

As can be seen from the above data, in the zoom lens of Examples 1 to 7, the zoom ratio is 22.1, the high zoom ratio is ensured, reduction in size and weight is achieved, and various aberrations are satisfactorily corrected in the entire zoom range, whereby high optical performance is achieved.

Figure 22:
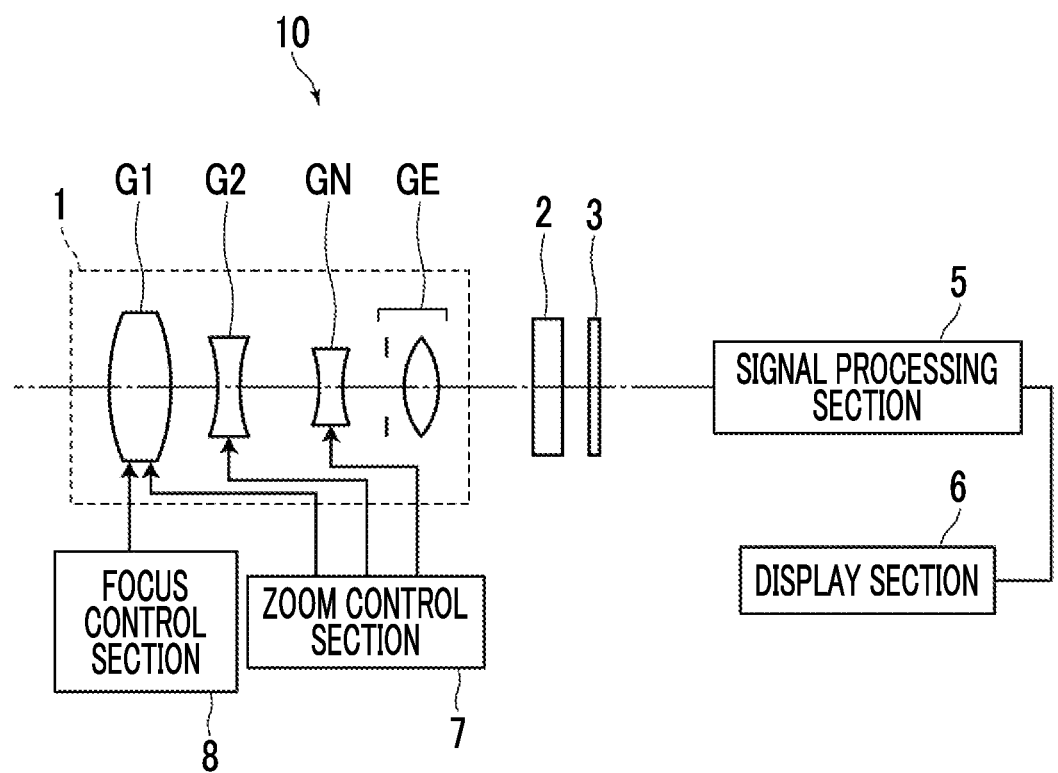
FIG. 22 is a schematic configuration diagram of an imaging apparatus according to an embodiment of the present invention.

Next, an imaging apparatus according to an embodiment of the present invention will be described. FIG. 22 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a movie imaging camera, a broadcast camera, a movie imaging camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 22 schematically shows the first lens group G1, the second lens group G2, the image side negative lens group GN, and the final lens group GE provided in the zoom lens 1. However, the number of lens groups included in the zoom lens 1 of FIG. 22 is an example, and the imaging apparatus of the present invention can be composed of a number of lens groups different from that in the example of FIG. 22.

The imaging element 3 captures an optical image, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 22 shows only one imaging element 3, but the imaging apparatus of the present invention is not limited to this, and may be a so-called three-plate imaging device having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric coefficient of each lens are not limited to the values shown in the numerical examples, and different values may be used therefor.

What is claimed is:

1. A zoom lens comprising:

a first lens group that is disposed to be closest to an object side, first moves toward an image side along an optical axis during zooming from a wide-angle end to a telephoto end, and has a positive refractive power;

a second lens group that is disposed to be adjacent to the first lens group on the image side of the first lens group, moves along the optical axis during zooming, and has a negative refractive power;

a final lens group that is disposed to be closest to the image side, includes an aperture stop, remains stationary with respect to an image plane during zooming, and has a positive refractive power; and an image side negative lens group that is disposed to be adjacent to the final lens group on the object side of the final lens group, moves along the optical axis during zooming, and has a negative refractive power, wherein distances between the adjacent lens groups in a direction of the optical axis change during zooming, and wherein assuming that a focal length of the image side negative lens group is fN and a focal length of the whole system at the wide-angle end in a case where an object at infinity is in focus is fw, Conditional Expression (1) is satisfied.

$$-15 < fN/fw < -3.5 \qquad (1)$$

2. The zoom lens according to claim 1, wherein assuming that a difference in position of the first lens group between the wide-angle end and the telephoto end in the direction of the optical axis is zr1 and a difference in position of the second lens group between the wide-angle end and the telephoto end in the direction of the optical axis is zr2, Conditional Expression (2) is satisfied.

$$0.05 < |zr1/zr2| < 0.4 \qquad (2)$$

3. The zoom lens according to claim 1, wherein assuming that a focal length of the final lens group is fE, Conditional Expression (3) is satisfied.

$$4 < fE/fw < 10 \qquad (3)$$

4. The zoom lens according to claim 1, wherein assuming that a lateral magnification of the image side negative lens group at the wide-angle end in a case where the object at infinity is in focus is βNw and a lateral magnification of the image side negative lens group at the telephoto end in a case where the object at infinity is in focus is βNt, Conditional Expression (4) is satisfied.

$$0.7 < |βNt/βNw| < 1.5 \qquad (4)$$

5. The zoom lens according to claim 1, wherein the first lens group has three or more positive lenses, and has a negative lens which is disposed to be closest to the object side.

6. The zoom lens according to claim 1, wherein assuming that an average of Abbe numbers of all positive lenses of the first lens group at a d line is vavep, Conditional Expression (5) is satisfied.

$$65 < vavep < 90 \qquad (5)$$

7. The zoom lens according to claim 1, wherein during zooming from the wide-angle end to the telephoto end, the first lens group first moves toward the image side along the optical axis, thereafter reversely moves toward the object side, and thereafter reversely moves toward the image side.

8. The zoom lens according to claim 1, wherein the zoom lens consists of, in order from the object side, the first lens group, the second lens group, the image side negative lens group, and the final lens group.

9. The zoom lens according to claim 1, wherein the zoom lens consists of, in order from the object side, the first lens group, the second lens group, an intermediate positive lens group that moves by changing a distance between the intermediate positive lens group and the adjacent lens group in the direction of the optical axis during zooming and has a positive refractive power, the image side negative lens group, and the final lens group.

10. The zoom lens according to claim 1, wherein focusing from the object at infinity to a close-range object is performed by moving only some lenses of the first lens group along the optical axis.

11. The zoom lens according to claim 1, wherein the first lens group consists of a plurality of sub-lens groups, and focusing from the object at infinity to a close-range object is performed by moving at least two of the sub-lens groups in a state where a relative distance therebetween in the direction of the optical axis is set to be different.

12. The zoom lens according to claim 1, wherein focusing from the object at infinity to a close-range object is performed by moving the second lens group and a lens group, which is disposed to be adjacent to the second lens group on the image side of the second lens group, in a state where a relative distance therebetween in the direction of the optical axis is set to be different.

13. The zoom lens according to claim 1, wherein Conditional Expression (1-1) is satisfied.

$$-12 < fN/fw < -4.5 \qquad (1\text{-}1)$$

14. The zoom lens according to claim 2, wherein Conditional Expression (2-1) is satisfied.

$$0.08 < |zr1/zr2| < 0.35 \qquad (2\text{-}1)$$

15. The zoom lens according to claim 3, wherein Conditional Expression (3-1) is satisfied.

$$4.5 < fE/fw < 8 \qquad (3\text{-}1)$$

16. The zoom lens according to claim 4, wherein Conditional Expression (4-1) is satisfied.

$$0.75 < |βNt/βNw| < 1.2 \qquad (4\text{-}1)$$

17. The zoom lens according to claim 6, wherein Conditional Expression (5-1) is satisfied.

$$70 < vavep < 80 \qquad (5\text{-}1)$$

18. An imaging apparatus comprising the zoom lens according to claim 1.

* * * * *